United States Patent

Tanaka et al.

[11] Patent Number: 5,943,442
[45] Date of Patent: Aug. 24, 1999

[54] METHOD OF IMAGE PROCESSING USING PARAMETRIC TEMPLATE MATCHING

[75] Inventors: Kouichi Tanaka, Tokozawa; Mutsuo Sano, Iruma; Syuuichi Ohara, Kodaira; Masashi Okudaira, Yokosuka, all of Japan

[73] Assignee: Nippon Telegraph and Telephone Corporation, Tokyo, Japan

[21] Appl. No.: 08/867,765

[22] Filed: Jun. 3, 1997

[30] Foreign Application Priority Data

| Jun. 12, 1996 | [JP] | Japan | 8-150534 |
| Jun. 12, 1996 | [JP] | Japan | 8-150535 |

[51] Int. Cl.$^6$ .............. G06K 9/62; G06K 9/64; G06K 9/32
[52] U.S. Cl. .......... 382/216; 382/191; 382/201; 382/209; 382/278; 382/300
[58] Field of Search .................. 382/181, 190, 382/191, 195, 197, 201, 203, 206, 209, 216, 217, 220, 228, 300

[56] References Cited

U.S. PATENT DOCUMENTS

| 4,633,400 | 12/1986 | Chittineni | 382/210 |
| 4,736,437 | 4/1988 | Sacks et al. | 382/211 |
| 4,980,614 | 12/1990 | Yamada et al. | 315/368 |
| 5,299,269 | 3/1994 | Gaborski et al. | 382/216 |
| 5,373,567 | 12/1994 | Takahashi et al. | 382/216 |
| 5,479,523 | 12/1995 | Gaborski et al. | 382/224 |
| 5,495,537 | 2/1996 | Bedrosian et al. | 382/209 |
| 5,675,661 | 10/1997 | Richman et al. | 382/216 |
| 5,675,663 | 10/1997 | Koerner et al. | 382/216 |
| 5,687,291 | 11/1997 | Smyth | 395/10 |
| 5,754,692 | 5/1998 | Kondo et al. | 382/216 |
| 5,774,576 | 6/1998 | Cox et al. | 382/225 |

*Primary Examiner*—Bipin H. Shalwala
*Attorney, Agent, or Firm*—Pollock, Vande Sande & Amernick

[57] ABSTRACT

In a template matching method, a region that has a plurality of normalized reference template images as vertex template images in a space of a template-pixel-size dimension is considered, and the vertex template images are linearly interpolated by a parameter w to provide a normalized interpolated template image of a magnitude 1 in the space. Then, matching between the normalized interpolated image and a search image is performed using a normalized correlation therebetween as a similarity measure, by which is obtained a parameter that provides the maximum normalized correlation value, and this normalized correlation value is determined as the maximum one.

16 Claims, 24 Drawing Sheets

REFERENCE TEMPLATE $\langle g \rangle_w = w_0 \hat{g}_0 + w_1 \hat{g}_1 + w_2 \hat{g}_2$

SORTING OF NORMALIZED CORRELATION
VALUES ON COARSE SEARCH

RE-SORTING CORRELATION VALUES OF
TOP v CANDIDATE LATTICE POINTS

☆ : COORDINATE & ANGLE
WHERE VALUES ARE
OBTAINED

METHOD OF IMAGE PROCESSING USING PARAMETRIC TEMPLATE MATCHING

BACKGROUND OF THE INVENTION

The present invention relates to an image processing technique for making a fast search of a search image for a portion similar to a reference template image.

In FIGS. 1A through 1C there is schematically shown a reference correlation matching scheme that has been widely used to search an image for an image portion having the highest degree of similarity to a reference template image. According to the normalized correlation matching scheme, a reference template image g of a size P×Q such as shown in FIG. 1B is moved in such a search image f of a size X×Y as shown in FIG. 1A in the x and y directions repeatedly as depicted in FIG. 1C to find a position where the highest normalized correlation is provided between the search image f and the template image G. In this example, reference template images $g_0, g_1, \ldots, g_M$, which are M+1 different views of an object image to be searched, are each matched with the object image in the search image f to detect a position where they show the highest degree of similarity.

Turning next to FIG. 2, the work flow of such a conventional template matching scheme will be described. The matching starts with setting a matching start position (x=0, y=0) in step S1. In step S2 a position of coordinates (x,y) in the search image f is set as a reference position for matching with the template image and the following normalized correlations between the search image f and the M+1 reference template images $g_0, g_1, \ldots, g_M$ are calculated:

$$(\hat{f}[x,y],\hat{g}_0), (\hat{f}[x,y],\hat{g}_1), \ldots, (\hat{f}[x,y],\hat{g}_M)$$

Then, in step S3 a check is made to determine if the reference matching position (x,y) has reached the final position (x=X−P, y=Y−Q). If not, the search proceeds to the next position in the search image f in step S4, and steps S1 through S4 are carried out again. When it is decided in step S3 that the final matching position (X−P,Y−Q) has been reached, the processing goes to step S5 in which the position (x,y) is output where the highest one of normalized correlations is obtained by scanning an image region ($0 \leq x \leq X-P$, $0 \leq y \leq Y-Q$).

With such a conventional template matching scheme, however, individual fluctuations of the object to be searched (hereinafter referred to as a search object) (e.g., deformations such as distortions, dents or pattern variations, or fluctuations of inspection environments (such as changes in illumination and in the position relative to the position of observation) give rise to problems such as a failure of search, an erroneous or incorrect search and a decrease in the accuracy of the position of search in the case of using one reference template image for matching with the search object. To solve these problems, it is conventional to perform matching of the search image with a plurality of reference template images corresponding to estimated fluctuations of the search object so as to detect the image position where the maximum correlation value is provided.

In this instance, the template images for matching with the search image need to be prepared taking into account factors in the fluctuations of the object to be detected and the fluctuation ranges. The prior art scheme uses a large number of such reference template images to cover the fluctuation ranges and to deal with small fluctuations. Another problem of the conventional scheme is the large amount of time that is required to match every template image with the search image over the entire region thereof (for obtaining correlation values). In addition to these disadvantages, there are cases where it is practically impossible to predict and prepare a large number of template images that cover the fluctuation ranges.

As described above, the prior art scheme involves estimation of fluctuations of the object to be searched and discrete preparation of a large number of template images corresponding to the estimated fluctuations—this gives rise to the problems of low reliability of the search results due to the suitability of representation by the template image and low search efficiency because of the use of a large number of template images.

SUMMARY OF THE INVENTION

It is therefore an object of the present invention to provide a template matching method that ensures fast production of highly reliable search results even if the object to be searched has fluctuations.

According to a first aspect of the present invention, there is provided a template matching method which comprises the steps of:

(a) calculating an inverse matrix $H^{-1}$ of a correlation matrix H using, as its elements, normalized correlations between a plurality of first template images;

(b) calculating a normalized correlation between each of the plurality of normalized first template images and at least one normalized second template image and calculating a correlation vector G; and (c) calculating, from said correlation vector G and said inverse matrix $H^{-1}$, an estimated parameter w that maximizes said normalized correlation between said normalized second template image and a normalized interpolated template image obtained by linearly combining, by said estimated parameter w, said normalized first template images.

In the above method, the plurality of first template images are a plurality of predetermined normalized reference template images and the second template image is a normalized matching region image at the position (x,y) in the search image.

The step (a) is a step of calculating an inverse matrix $H^{-1}$ of a correlation matrix H that uses, as its elements, normalized correlations between the plurality of reference template images $(g_0, \ldots, g_M)$.

The step (b) is a step of calculating normalized correlations between a plurality of normalized reference template images $(\hat{g}_0, \ldots, \hat{g}_M)$ and a matching region image $\hat{f}(x,y)$ normalized at the position (x,y) in the search image and calculating the correlation vector G.

The step (c) includes a step of calculating a normalized interpolated template image $<g>_w$ from the estimation parameter w.

The above method further comprises the steps of:

(d) calculating and storing a normalized correlation between the normalized interpolated template image $<g>_w$ and the matching region image f(x,y) at the position (x,y);

(e) repeating the steps (b) through (d) while sequentially shifting the position (x,y) in the search image; and (f) finding the maximum one of the stored normalized correlations, thereby detecting a position where the normalized correlation value is at the maximum.

Alternatively, in the above method the plurality of normalized first template images include at least one normalized matching region image at the position (x,y) in the search image or its vicinity, and the second template image is a preset normalized reference template image.

The step (a) is a step of calculating an inverse matrix $H^{-1}$ of a correlation matrix H that uses, as its elements, normalized correlations between the plurality of matching region images $(f_0, \ldots, f_M)$.

The step (b) is a step of calculating normalized correlations between a plurality of matching region images $(\hat{f}_0, \ldots, \hat{f}_M)$ normalized at the position (x,y) in the search image and a normalized reference template image $\hat{g}$ and calculating the correlation vector G.

The step (c) includes a step of calculating a normalized interpolated template image $f_w$, from the estimated parameter w.

DESCRIPTION OF THE PREFERRED EMBODIMENTS

First Embodiment

Figure 3:
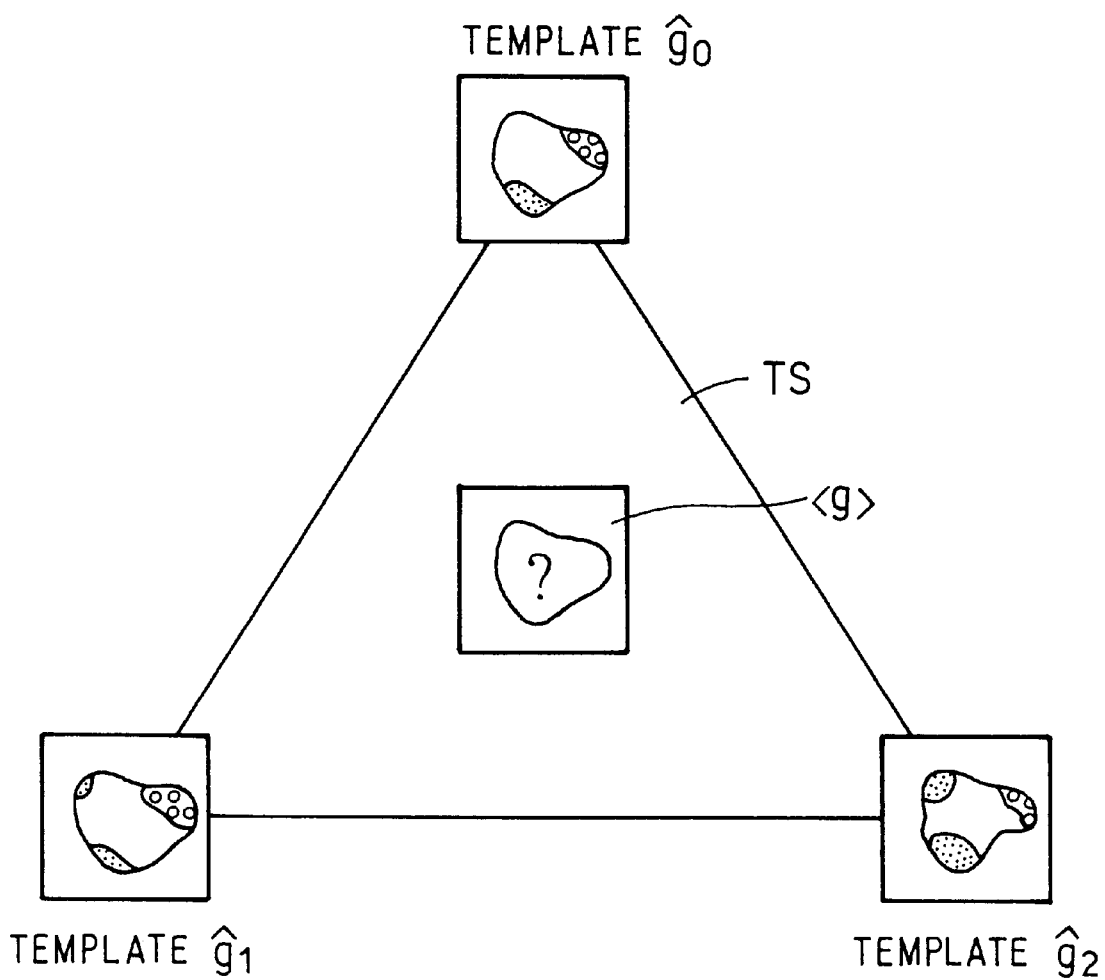
FIG. 3 is a schematic diagram illustrating a reference template space expanded by vertex templates, for explaining a first embodiment of the present invention.

To determine a region in the search image that has the highest degree of similarity to the reference template, this first embodiment performs fast, high reliability matching of a search object having fluctuations that one template cannot represent, by carrying out a first step of constructing a parametric template space TS from a plurality of templates $(g_0, g_1, \ldots, g_M,$ where M=2) as shown in FIG. 3, for example, and a second step of performing fast matching using a normalized correlation between a template $\hat{g}$ in the template space TS and the search image f as a similarity measure. In the first step, a region is considered that has M+1 normalized templates $\hat{g}_0, \hat{g}_1, \ldots, \hat{g}_M$ as vertices in a space that has a dimension equal to the pixel size P×Q=N of the template, then a template in the region is linearly interpolated from the vertex templates, and the size of the linearly interpolated template is normalized to 1 to represent the reference template space in parametric form, that is, as a continuous reference template pattern that is two-dimensional, not discrete as in the prior art scheme. In the second step, a parameter that provides the maximum normalized correlation value between the parametric template in the region and the search image is calculated quickly from normalized correlation values between the plurality of vertex templates and the search image, by using a parameter estimation equation. By this, the parameter and the corresponding normalized correlation value are determined. In this way, according to the present invention, the search image is quickly searched only by calculating the normalized correlation values between a small number of templates forming vertices and the search image even if the search object has fluctuations, and stable and highly reliable search results are obtained by continuous processing of fluctuations through the parametric representation.

Next, this first embodiment will be described in detail on the basis of the principle of the present invention. A brief description will be given first of the normalized correlation matching.

<Normalized Correlation>

Figure 1A:
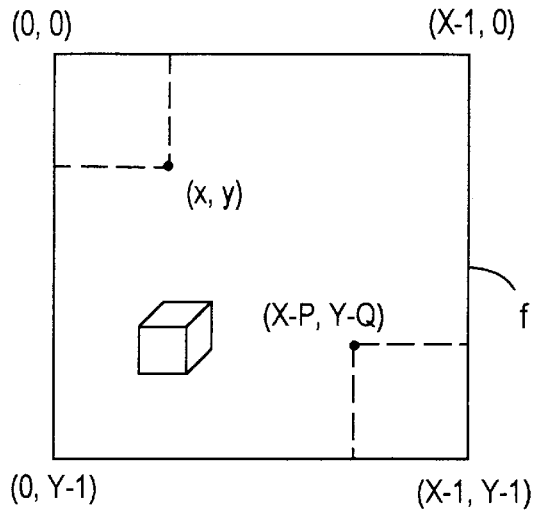
FIG. 1A is a schematic diagram showing a search image for explaining an image search using a conventional template matching scheme.
Figure 1B:
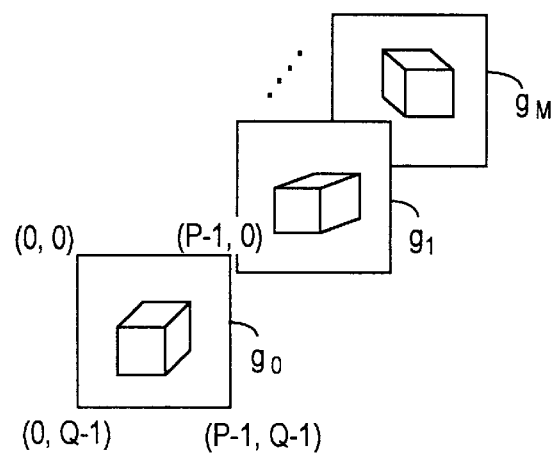
FIG. 1B is a schematic diagram showing a plurality of reference template images for search use.
Figure 1C:
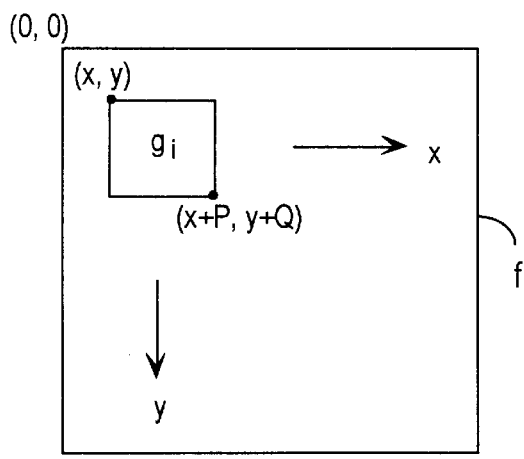
FIG. 1C is a schematic diagram showing the relationship between the search image and the reference template image.
Figure 2:
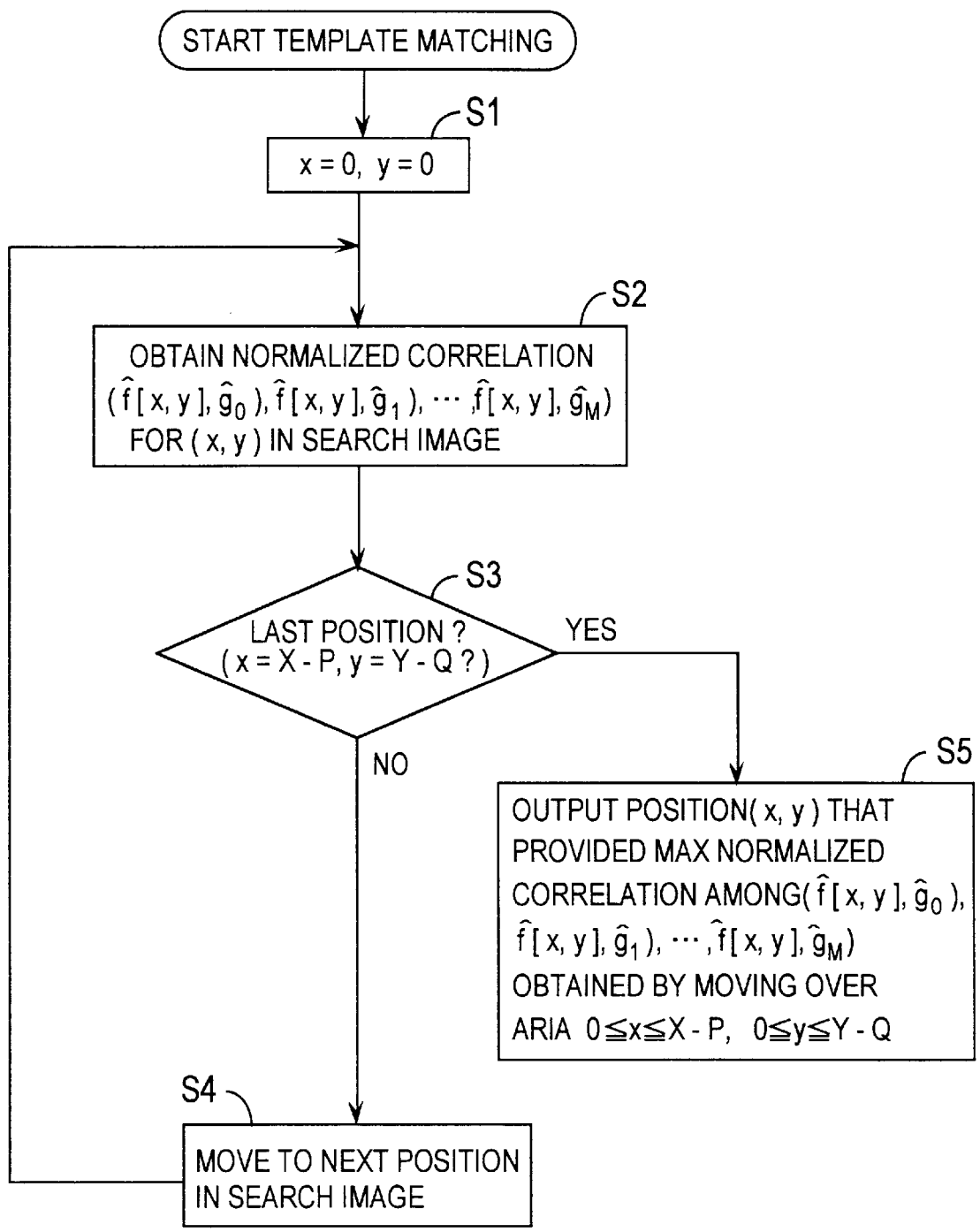
FIG. 2 is a flowchart for explaining a conventional template matching scheme.

Consider the image search that scans the search image of a size X×Y, as shown in FIG. 1A, by the template image of a size P×Q, as shown in FIG. 1B, from left to right and top to bottom as shown in FIG. 1C to detect the position where they show the highest degree of similarity and the similarity at that position. The normalized correlation matching scheme adopts the following correlation value corr[x,y] as the similarity measure between the search image and the template image at an arbitrary matching reference position (x,y):

$$corr[x, y] \equiv \frac{\sum_{p,q \in TW} (f[x+p, y+q] - \bar{f}[x, y]) \times (g[p, q] - \bar{g})}{\left\{\sum_{p,q \in TW} (f[x+p, y+q] - \bar{f}[x, y])\right\}^{1/2} \times \left\{\sum_{p,q \in TW} (g[p, q] - \bar{g})^2\right\}^{1/2}} \quad (1)$$

where it is assumed that f denotes the search image, g the template image, f[x,y] the brightness at a pixel position (x,y) in the search image f and g[p,q] the brightness at a pixel position (p,q) in the template image g. The range of a window SW at the position (x,y) is x,y∈SW≡{(x,y)|0≦x<X, 0≦y<Y} and the range of a window TW at the position (p,q) is p,q∈TW≡{(p,q)|0≦p<P,0≦q<Q}. Further, $\bar{f}$[x,y] and $\bar{g}$ represent mean brightness values in a matching region of a size P×Q in the search image f and in the template image g, respectively, and they are defined by the following equations:

$$\bar{f}[x, y] \equiv \sum_{p,q \in TW} f[x+p, y+q] / \Sigma(p, q) \in TW \quad (2)$$

$$\bar{g} \equiv \sum_{p,q \in TW} g[p, q] / \Sigma(p, q) \in TW \quad (3)$$

Incidentally, the denominator $\Sigma$(p,q∈TW) in each of Eqs. (2) and (3) represents the number of pixels N of the template image, and N=PQ. With this definition, the normalized correlation value corr[x,y] takes a value in the range of from −1.0 to +1.0; the closer to the value 1.0, the higher the degree of similarity.

<Normalized Interpolation of Unit Vector>

To extend the above-described normalized correlation matching to matching in the parametric reference template space, a normalized interpolation of unit vectors is employed as described below.

Let a series of N pixels forming each image be regarded as N components that constitute an N-dimensional vector $\hat{g}$ and let M+1 template images be represented by M+1 vectors $\hat{g}_0, \ldots, \hat{g}_M$. When the vectors $\hat{g}_0, \ldots, \hat{g}_M$ are set as arbitrary unit vectors that have a common starting point in an N-dimensional vector space common to them, an arbitrary vector having a terminal in a unit region expanded by terminals (endpoints) of these vectors can be provided in the following form by introducing M+1 parameters $w_i$ (0≦i≦M):

$$\sum_{i=0}^{M} w_i \bar{g}_i \quad (0.0 \leq w_i \leq 1.0, \Sigma w_i = 1.0) \quad (4)$$

Figure 4:
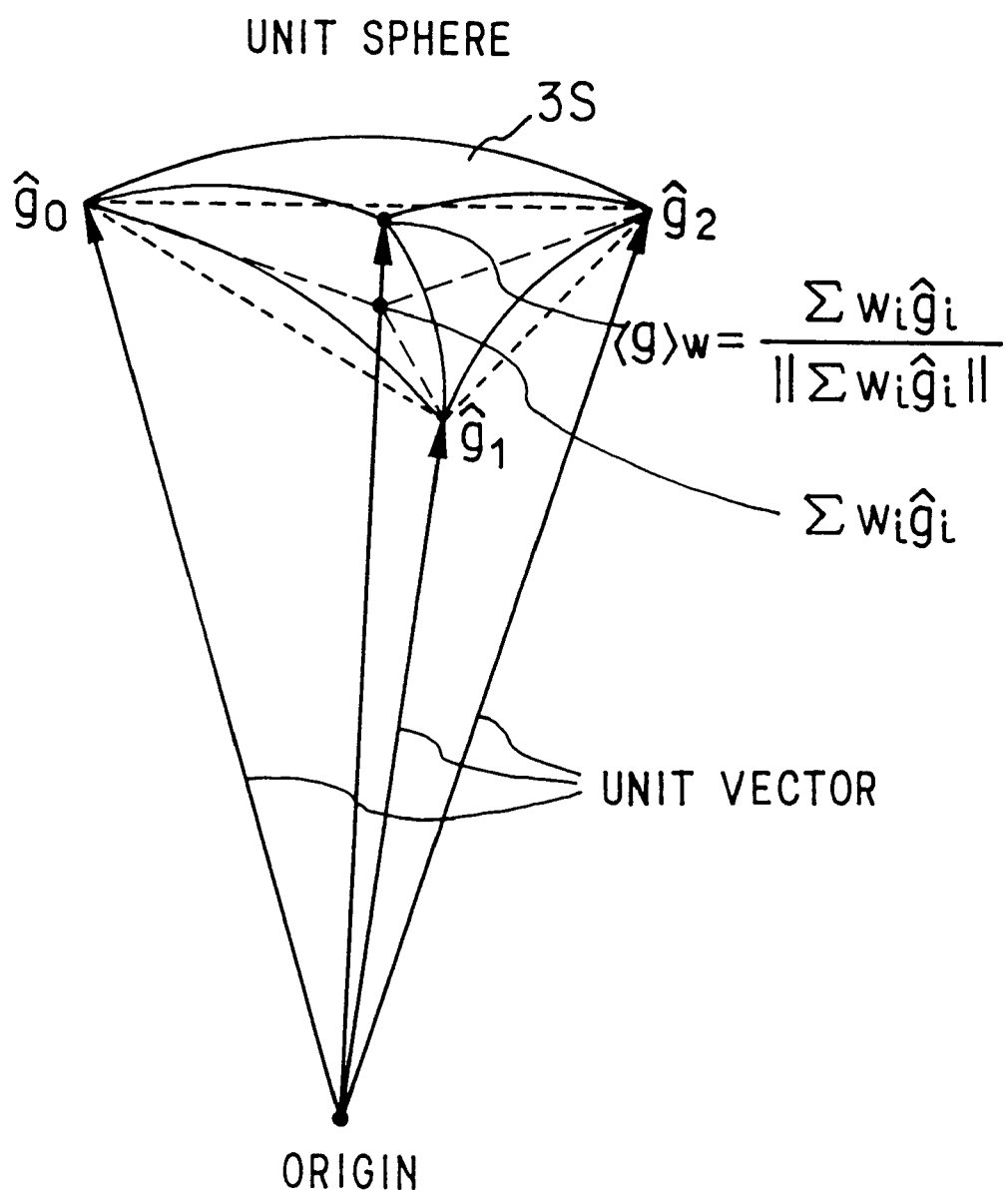
FIG. 4 is a schematic diagram for explaining a normalized interpolation of unit vectors in the first embodiment.
Figure 5:
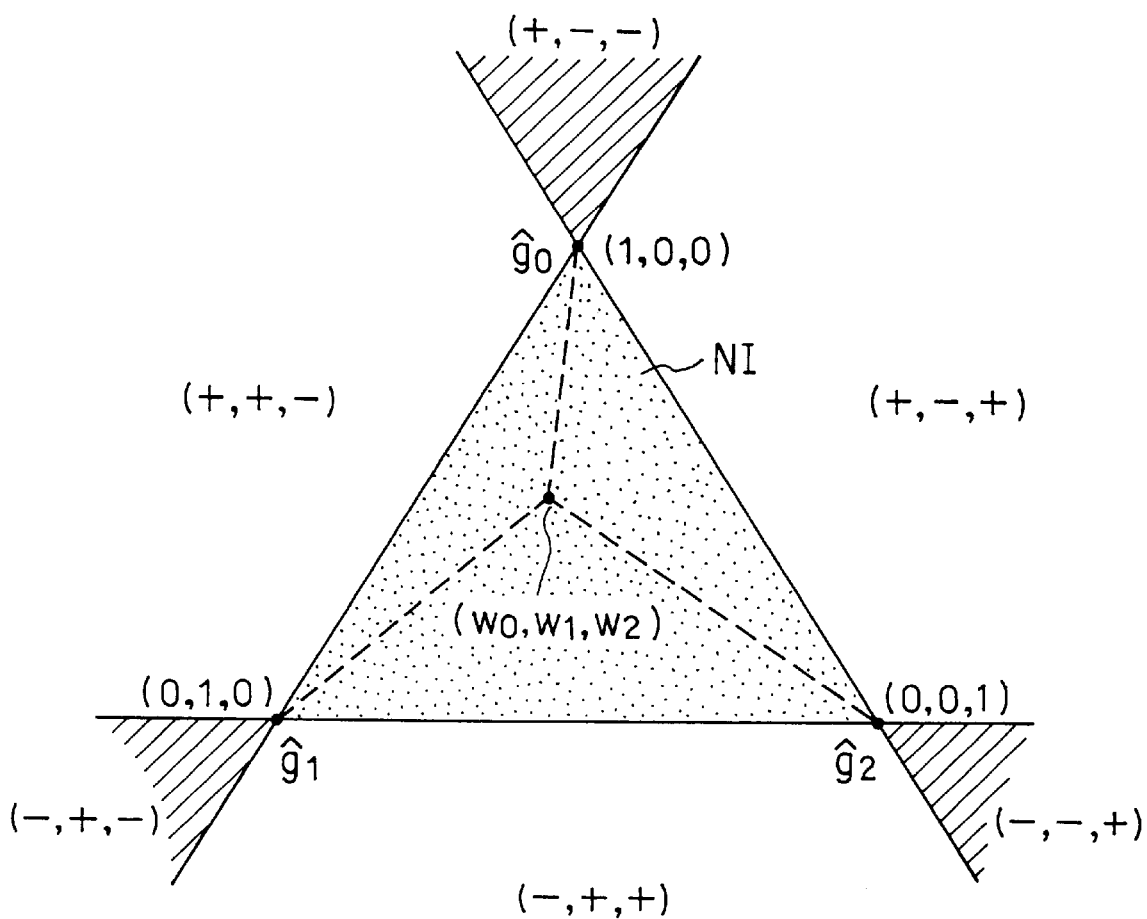
FIG. 5 is a schematic diagram for explaining a parameter (w) representation of the reference template in the first embodiment.

Assume that the template images $g_0, \ldots, g_M$ are prepared by a user of this system. The vector thus formed is not always a unit vector, but a vector of a magnitude or value normalized to 1, given by the following equation, is a unit vector:

$$\langle g \rangle_w \equiv \sum_{i=0}^{M} w_i \bar{g}_i \bigg/ \left\|\sum_{i=0}^{M} w_i \bar{g}_i\right\| \quad (5)$$

where ∥∥ indicates a norm. {<g><sub>w</sub>|0.0≦$w_i$≦1.0,$\Sigma w_i$=1.0} will hereinafter be referred to as a normalized interpolation region having its vertices defined by the vectors $\hat{g}_0, \ldots, \hat{g}_M$ and <g><sub>w</sub> as a normalized interpolation by the parameter $w_i$. In FIG. 4, the normalized interpolated region having its vertices defined by three unit vectors $\hat{g}_0, \hat{g}_1$ and $\hat{g}_2$ is shown as a triangle region 3S mapped on a unit sphere. A region whose parameters $w_i$ are all positive or zeroes as shown in FIG. 5 is a normalized interpolated region NI.

Letting $\hat{f}$ denote a certain unit vector, the normalized unit vector <g><sub>w</sub> that has the maximum match with the vector $\hat{f}$ in the above-mentioned normalized interpolated region is a vector given by the parameter $w_i$ (0≦i≦M) that maximizes the normalized correlation value expressed by the following equation:

$$\operatorname*{argmax}_{w_i} (\hat{f}, \langle g \rangle_w), \text{ where } \sum_{i=0}^{M} w_i = 1 \quad (6)$$

The normalized correlation value ($\hat{f}$,<g><sub>w</sub>) is the following normalized correlation value that is obtained by setting $\bar{f}$[x,y]=0 and <$\bar{g}$><sub>w</sub>=0 and the value in each brace of the denominator at 1 in Eq. (1):

$$\sum_{p,q \in TW} \{\bar{f}[x+p, y+q] \langle g \rangle_w [p, q]\} \equiv (\bar{f}, \langle g \rangle_w)$$

This can be rewritten as follows:

$$(\bar{f}, \langle g \rangle_w) \equiv \Sigma_j \bar{f}[j] \times \langle g \rangle_w [j] \quad (7)$$

where j indicates a j-th one of the components of the N-dimensional vector. A parameter w that maximizes the normalized correlation value ($\hat{f}$,<g><sub>w</sub>), solved by the method of Lagrange multiplier, is given by the following equation:

$$w \equiv \frac{H^{-1} G}{(n, H^{-1} G)} \quad (8)$$

Here, $$w \equiv [w_0, w_1, \ldots, w_M]^T \quad (9)$$

$$H \equiv \begin{bmatrix} (\hat{g}_0, \hat{g}_0) & (\hat{g}_0, \hat{g}_1) & \cdots & (\hat{g}_0, \hat{g}_M) \\ (\hat{g}_1, \hat{g}_0) & (\hat{g}_1, \hat{g}_1) & \cdots & (\hat{g}_1, \hat{g}_M) \\ \vdots & \vdots & & \vdots \\ (\hat{g}_M, \hat{g}_0) & (\hat{g}_M, \hat{g}_1) & \cdots & (\hat{g}_M, \hat{g}_M) \end{bmatrix} \quad (10)$$

$$G = [(\hat{f}, \hat{g}_0), (\hat{f}, \hat{g}_1), \ldots, (\hat{f}, \hat{g}_M)]^T \quad (11)$$

$$n = [1, 1, \ldots, 1]^T \quad (12)$$

where $^T$ indicates a transposition. The condition for which the normalized interpolated template <g><sub>w</sub> by the parameter w thus obtained remains in the normalized interpolated region is as follows:

$$0.0 \leq w_i \leq 1.0 \text{ (for all i's)} \quad (13)$$

When this condition is not satisfied, the solution is at the boundary of the interpolated region, so that the above solution is recursively carried out at a boundary lower by one dimension to complete the solution.

It must be noted here that the maximum normalized correlation value max($\hat{f}$,<g>$_w$) of the normalized-interpolated unit vector <g>$_w$ with respect to the unit vector f and its parameter value w are calculated from only a simple relationship between the vertex unit vector normalized correlation value G and the correlation matrix H representing the construction between the vertex vectors. This is an advantage of using normalized linear interpolation, since other interpolation schemes cannot achieve this by such a simple equation.

<Normalized Interpolation of Correlation Template>

Here, the parameter estimation equation (8) is applied to normalized correlation matching of images. This is based on the fact that the template image of the pixel size P×Q=N can be regarded as an N-dimensional vector. That is, the following correspondence between the pixel position (p,q) in a two-dimensional image and the position j of a j-th component of the N-dimensional vector applies to the result of the normalized interpolation of the unit vector:

$$[p,q] \leftrightarrow [j] \quad (14)$$

Incidentally, Eq. (1) of the normalized correlation is nothing less than the following normalized correlation between the normalized template image $\hat{g}$ and a search image $\hat{f}$[x,y] normalized at the position (x,y):

$$\text{corr}[x,y] = (\hat{f}[x,y], \hat{g}) \quad (15)$$

Here, the normalization $\hat{g}$ of the template image g is defined by $$\hat{g}[p,q] \equiv \frac{g[p,q] - \bar{g}}{\left\{\sum_{p,q \in TW}(g[p,q] - \bar{g})^2\right\}^{1/2}} \quad (16)$$

and satisfies the following conditions for normalization:

$$\sum_{p,q \in TW} \hat{g}[p,q] = 0.0 \quad (17)$$

$$\sum_{p,q \in TW} \hat{g}[p,q] \times \hat{g}[p,q] = 1.0 \quad (18)$$

The normalized image $\hat{f}$[x,y] of the image f at the matching reference position (x,y) is defined by $$(\hat{f}[x,y])[p,q] \equiv \frac{\hat{f}[x+p, y+q] - \bar{f}[x,y]}{\left\{\sum_{p,q \in TW}(\hat{f}[x+p, y+q] - \bar{f}[x,y])^2\right\}^{1/2}} \quad (19)$$

Now, a parametric template <g>$_w$ is defined with respect to a vertex template image $\hat{g}$(i=0,1, . . . ,M) as described below.

$$\langle g \rangle_w[p,q] \equiv \frac{\sum_{i=0}^{M} w_i \hat{g}_i[p,q]}{\left\|\sum_{i=0}^{M} w_i \hat{g}_i\right\|} \quad (20)$$

This represents a template in a region expanded by the vertex template image $\hat{g}_i$ and can be considered to represent various reference template patterns in parametric form, for example, one-dimensional when M=1 and two-dimensional when M=2.

Incidentally, based on the normalization property of the terminal template image $\hat{g}_i$, the thus expanded parametric template <g>$_w$ also satisfies the following conditions for normalization:

$$\sum_{p,q \in TW} \langle g \rangle_w[p,q] = 0.0 \quad (21)$$

$$\sum_{p,q \in TW} \langle g \rangle_w[p,q] \times \langle g \rangle_w[p,q] = 1.0 \quad (22)$$

Since the template image that satisfies these conditions for normalization can be regarded as a unit vector in a space having a dimension of the image size, the parameter value $w_i$ that provides the maximum normalized correlation between the parametric template <g>$_w$ and the image f[x,y] and the normalized correlation value max($\hat{f}$<g>$_w$) at that time can similarly be calculated by the parameter estimation equation (8) from the normalized correlation value ($\hat{f},\hat{g}_i$) of the vertex template $g_i$.

The following is a summary of the parametric reference template algorithm. What is performed off-line (preparation prior to search) is:

1. To select the vertex template gi from a given sample image set; and
2. To calculate the matrix H that defines the construction between vertices and its inverse matrix H$^{-1}$.

Next, at each matching reference position (x,y) in the search:

1. To calculate the normalized correlation value ($\hat{f}$[x,y],$\hat{g}_i$) of the vertex template; and
2. To determine the parameter $w_i$ from the normalized correlation value by the parameter estimation equation (8) and to calculate the normalized correlation value corresponding to the parameter. In this instance, the position (x,y) where the maximum normalized correlation value is provided is the matching position.

Concrete Example

A description will be given, with reference to FIGS. 6 and 7, of the outline of the procedure of execution in the first embodiment of the present invention. This embodiment is intended to find the position in the search image f that has the highest degree of similarity to the reference template pattern expressed by the reference template image set $g_i$ when the search image f and the plurality of reference template images $g_i$ are given.

Figure 6:
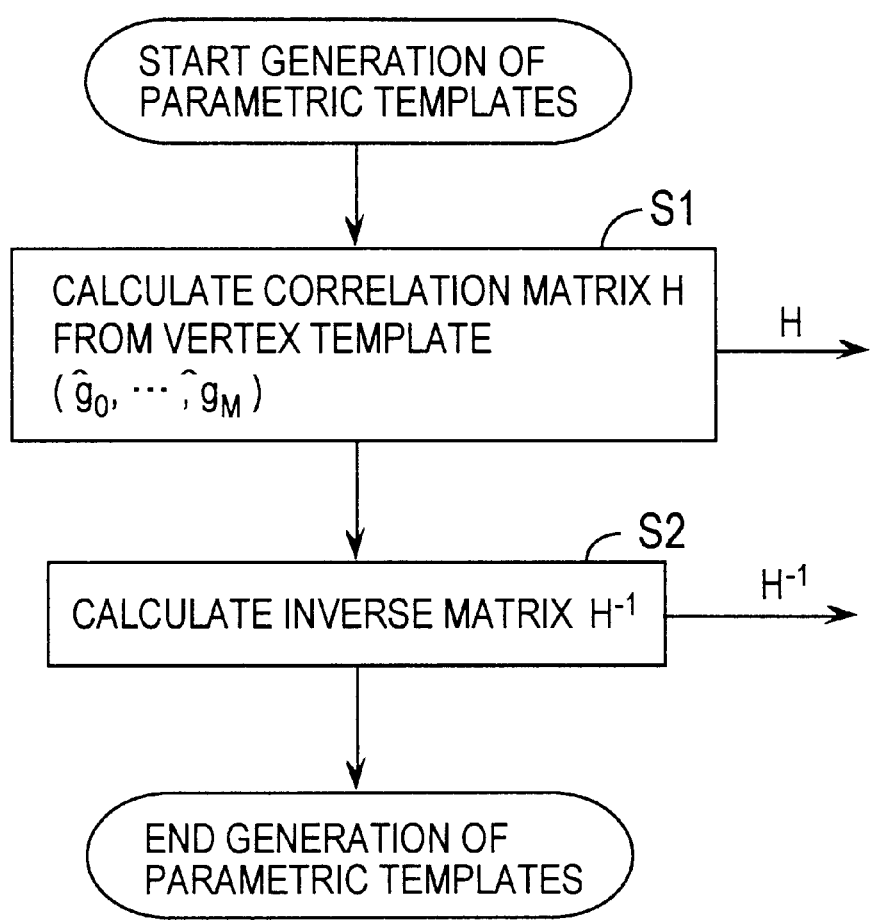
FIG. 6 is a flowchart of off-line processing in the first embodiment.

As shown in FIG. 6, the procedure begins with step S1 of calculating the correlation matrix H from the reference template images $g_i$ by Eq. (10) so as to generate the parametric reference template off-line from the reference template. Next, the inverse matrix H$^{-1}$ of the correlation matrix H is calculated in step S2. These steps are carried out off-line.

Figure 7:
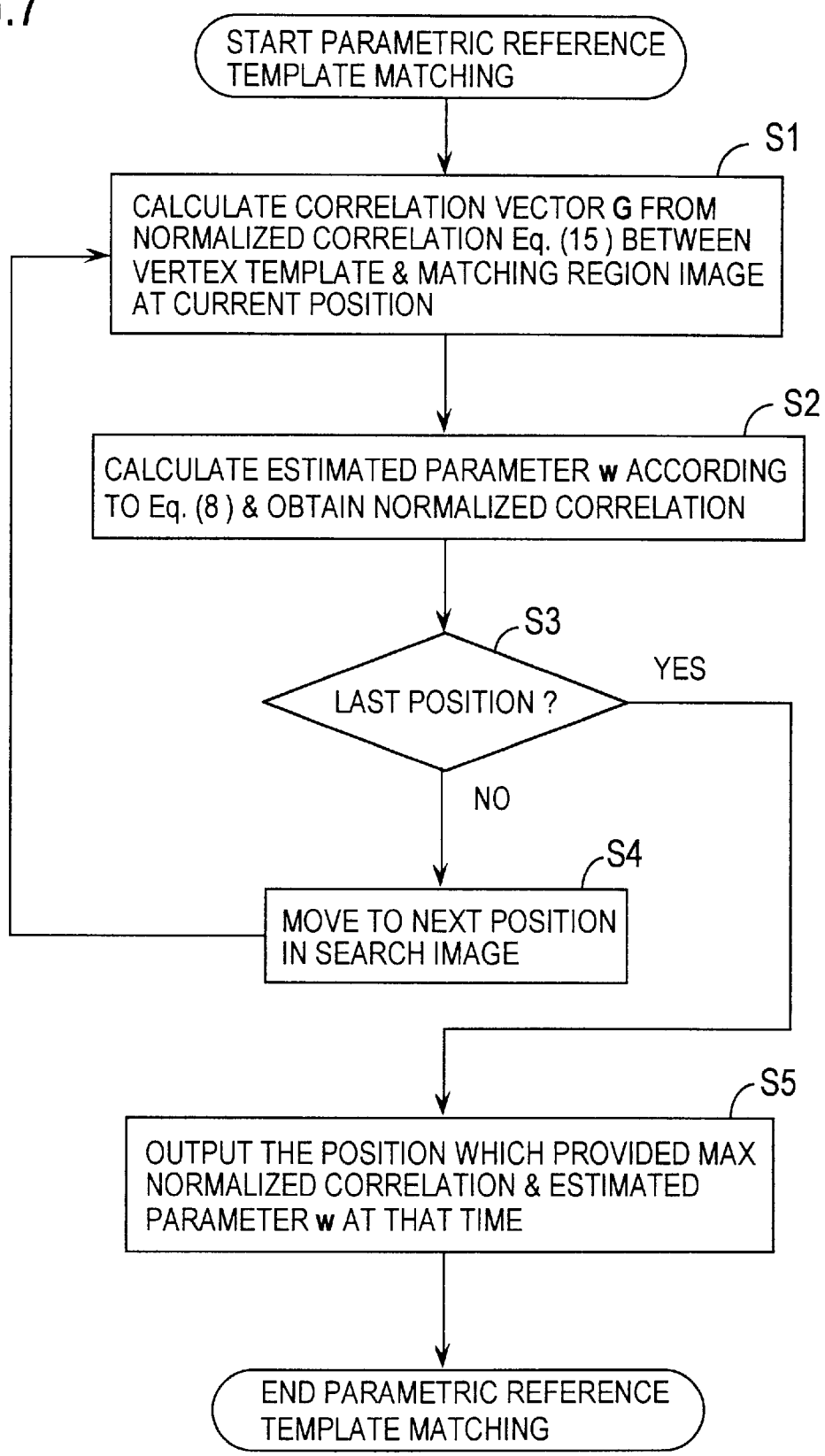
FIG. 7 is a flowchart of on-line processing in the first embodiment.

Turning next to FIG. 7, the on-line procedure that is performed during inspection will be described. During inspection the position where to calculate the normalized correlation between the search image f and the reference template $g_i$ is shifted in the search image f from left to right and top to bottom as shown in FIG. 1C to find the position where the maximum normalized correlation value is provided. In step S1 the normalized correlation value between the reference template $g_i$ and the search image f at a first matching position is calculated by Eq. (15) and the normalized correlation vector G defined by Eq. (11) is generated. Next, in step S2 the parameter w is calculated by Eq. (8) from the inverse matrix $H^{-1}$ of the correlation matrix H precalculated off-line and the normalized correlation value by the parameter w is calculated. In step S3 check is made to see if the final matching position (X-P,Y-Q) has been reached. If not, matching proceeds to the next position in the search image f in step S4, then the processing goes back to step S1, and steps S1 through S4 are carried out again. This is repeated until the lower right final matching position in the search image f is reached. When it is found in step S3 that matching has reached the final position, the processing proceeds to step S5 wherein the search image f at the position where the maximum normalized correlation value is provided, the position of the search image f where the reference template image has the highest degree of similarity to the search image and an estimation parameter at that time are output, with which the matching processing ends.

Figure 8:
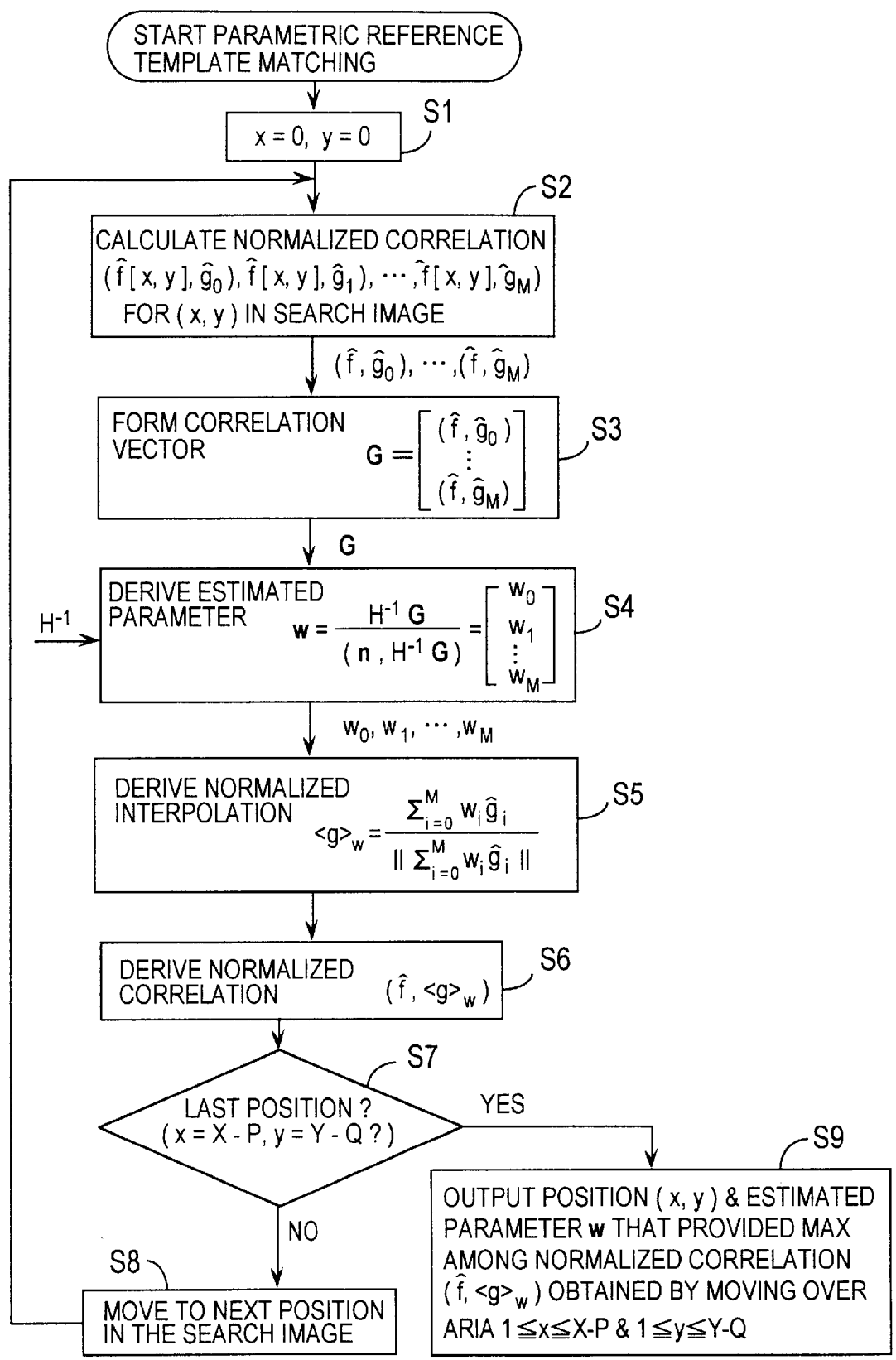
FIG. 8 is a detailed flowchart of on-line processing in the first embodiment.

Next, a detailed description will be given, with reference to FIG. 8, of the execution procedure in the above first embodiment.

In step S1 the matching start position (x=0,y=0) is set, then in step S2 normalized correlations $(\hat{f}[x,y],\hat{g}_0)$, $(\hat{f}[x,y], \hat{g}_1)$, ..., $(\hat{f}[x,y],\hat{g}_M)$ are calculated with respect to the coordinates (x,y) in the search image, and in step S3 $(\hat{f}\hat{g}_0), \ldots, (\hat{f}, \hat{g}_M)$ are substituted into Eq. (11) to complete the correlation vector G. Next, in step S4 the correlation vector G and the inverse matrix $H^{-1}$ of the correlation matrix H of Eq. (10) are substituted into Eq. (8) to derive the estimated parameter w. In step S5 the parameter $w=(w_0, w_1, \ldots, w_M)$ is substituted into Eq. (5) to derive the normalized interpolated template image $<g>_w$ of the unit vector, and in step S6 the normalized correlation $(\hat{f},<g>_w)$ is derived. In step S7 a check is made to see if the final matching position in the search image f has been reached, and if not, matching proceeds in step 58 to the next position in the search image f. Until the final matching position is reached, the steps S1 through S8 are carried out repeatedly while shifting the matching position in the search image f. When it is determined in step 57 that the final matching position is reached, the position (x,y) where the maximum one of the normalized correlation values obtained by scanning the search image f over the region (0≦x≦X-P, 0≦y≦Y-Q) is provided and the estimated parameter are output in step S9, with which the execution procedure ends.

As described above, the first embodiment of the present invention is based on the fact that it is possible to calculate the normalized interpolated template image ĝ that has the maximum normalized correlation with the normalized search image in the normalized template interpolated region expanded by a plurality of normalized template images. That is, there is no need of calculating the correlation value between every template image and the search image as in the prior art and it is necessary only to determine the normalized interpolated template image $<g>_w$ so that the normalized correlation with the normalized search image at each reference matching position is maximized, and to calculate the normalized correlation value as the similarity at the reference matching position. The position (x,y) where the greatest one of the similarities thus obtained at the respective reference matching positions (x,y) in the search image is provided is the position of the image most similar to the detected template image. Hence, the processing time for search can be significantly reduced and the likelihood of a search failure or erroneous search can be sharply diminished.

Second Embodiment

According to the present invention, contrary to the above example in which a plurality of template images are used to obtain the maximum correlation value between them and the matching region image at each reference matching position (x,y) in the search image as described above, it is also possible to employ a second scheme in which a normalized interpolated region, similar to that in the above first embodiment, is formed at each reference position in the search image by a plurality of neighbor matching region images and the normalized interpolated vector, which provides the highest normalized correlation with respect to the template image in that region. The second embodiment of the present invention will be described below.

Figure 9:
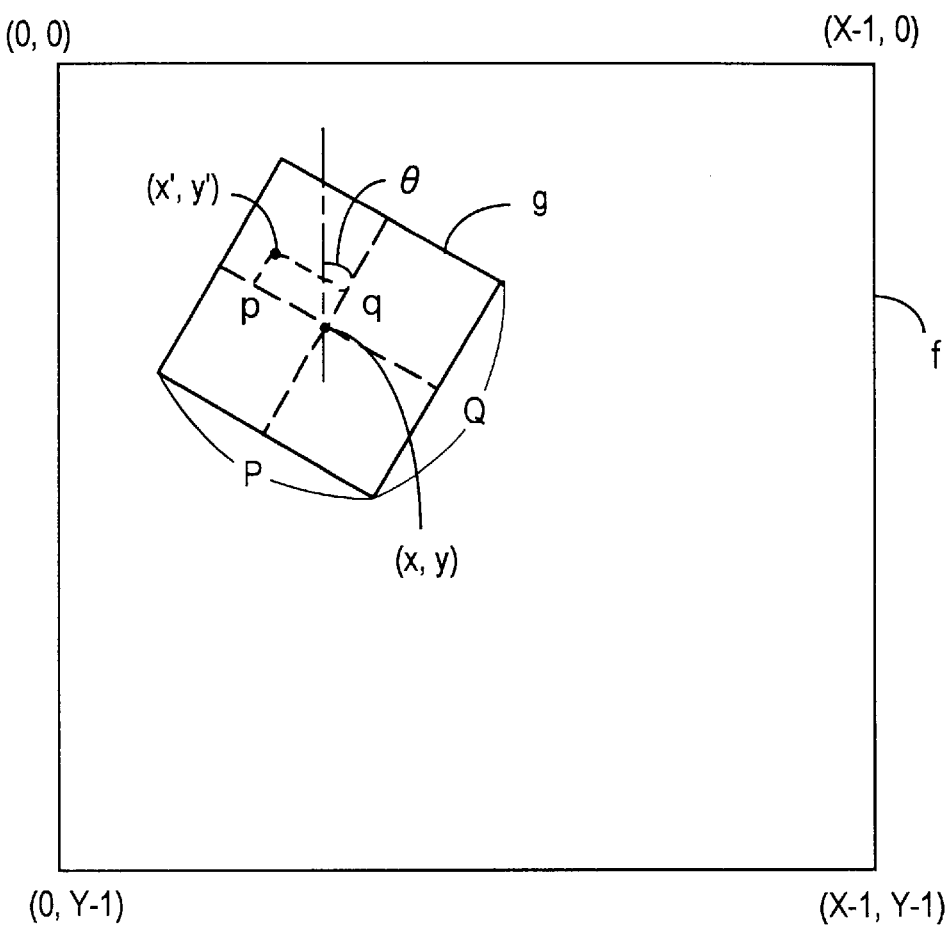
FIG. 9 is a schematic diagram for explaining a reference image search by normalized correlation in a second embodiment of the present invention.

The principle of the second embodiment is basically identical with the principle of the first embodiment. In the second embodiment, as depicted in FIG. 9, the rotation angle θ of the reference template image to the matching region is also varied so that the correlation value at each reference matching position in the search image becomes maximum. To allow ease in the representation of rotational coordinates, the center (P/2,Q/2) of the reference template image of a size P×Q is held at the reference matching position (x,y) in the search image and a position (x',y') in the search image that corresponds to an arbitrary pixel position (p,q) on the template image is expressed by the following equations:

$$x'=x+(p-P/2)\cos\theta-(q-Q/2)\sin\theta \quad (23)$$

$$y'=y+(p-P/2)\sin\theta-(q-Q/2)\cos\theta \quad (24)$$

As shown in FIG. 9, the reference template g of the size P×Q=N is turned through a predetermined angle Δθ within a predetermined angular range at each matching position (x,y) in the search image f of the size X×Y and a correlation value corr[x,y,θ] given by the following equation, as is the case of Eq. (1), is used as the measure of similarity to the search image at each position-angle (x,y,θ):

$$corr[x,y,\theta] \equiv \frac{\sum_{p,q \in TW}(f[x',y']-\bar{f}[x,y]) \times (g[p,q]-\bar{g})}{\left\{\sum_{p,q \in TW}(f[x',y']-\bar{f}[x,y])^2\right\}^{1/2} \times \left\{\sum_{p,q \in TW}(g[p,q]-\bar{g})^2\right\}^{1/2}} \quad (25)$$

Here, let it be assumed that f denotes the search image, g the template image, f[x,y] the brightness at a pixel position (x,y) in the search image f and g[p,q] the brightness at a pixel position (p,q) in the template image g. The range of a window SW at the position (x,y) is x,y∈SW≡{(x,y)|0≦x<X, 0≦y<Y} and the range of a window TW at the position (p,q) is p,q∈TW≡{(p,q)|0≦p<P, 0≦q<Q}. Further, $\bar{f}[x,y]$ and $\bar{g}$ represent mean brightness values in a matching region of the size P×Q in the search image f and in the template image g, respectively, and they are defined by the following equations:

$$\bar{f}[x, y, \theta] \equiv \sum_{p,q \in TW} f[x', y']/\Sigma(p, q) \in TW \quad (26)$$

$$\bar{g} \equiv \sum_{p,q \in TW} g[p, q]/\Sigma(p, q) \in TW \quad (27)$$

Incidentally, the denominator $\Sigma(p,q \in TW)$ in each of Eqs. (26) and (27) represents the number of pixels N of the template image, and N=PQ. With this definition, the normalized correlation value corr[x,y,θ] takes a value in the range of from −1.0 to +1.0; the closer to the value 1.0, the higher the degree of similarity.

<Normalized Interpolation of Unit Vector>

As referred to previously, according to this second embodiment, a parametric interpolated image is derived from a plurality of matching region images on the search image f, not from the reference template image. To this end, the normalized interpolation of the unit vector is utilized as described below so as to extend the above-described normalized correlation matching to matching in a parametric reference template space.

Let M+1 matching region images be represented by M+1 N-dimensional vectors $\hat{f}_0, \ldots, \hat{f}_M$. When the vectors $\hat{f}_0, \ldots, \hat{f}_M$ are set as arbitrary unit vectors having a common starting point in an N-dimensional vector space common to them, an arbitrary vector having a terminal in a unit region expanded by terminals (endpoints) of these vectors can be provided in the following form by introducing M+1 parameters $w_i$ (0≤i≤M):

$$\sum_{i=0}^{M} w_i \hat{f}_i \quad (0.0 \le w_i 1.0, \Sigma w_i = 1.0) \quad (28)$$

The vector thus formed is not always a unit vector, but a vector of a magnitude or value normalized to 1, given by the following equation, is a unit vector:

$$\langle f \rangle_w \equiv \sum_{i=0}^{M} w_i \hat{f}_i / \left\| \sum_{i=0}^{M} w_i \hat{f}_i \right\| \quad (29)$$

Figure 10:
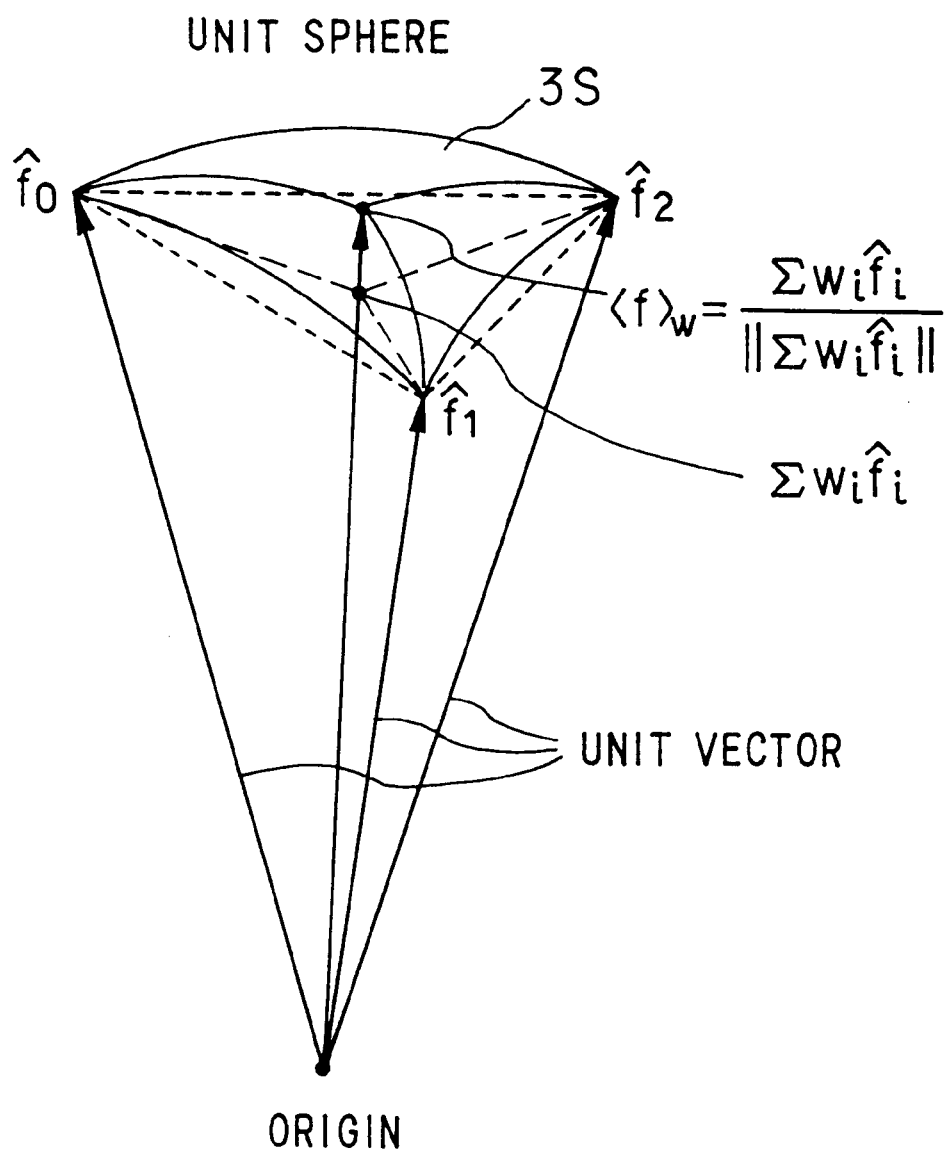
FIG. 10 is a schematic diagram for explaining a normalized interpolation of unit vectors in the second embodiment.

$\{<f>_w | 0.0 \le w_i \le 1.0, \Sigma w_i = 1.0\}$ will hereinafter be referred to as a normalized interpolated region having its vertices defined by the vectors $\hat{f}_0, \ldots, \hat{f}_M$ and $<f>_w$ as a normalized interpolation at the position of the parameter $w_i$. In FIG. 10, the normalized interpolated region having its vertices defined by three unit vectors $\hat{f}_0, \hat{f}_1$ and $\hat{f}_2$ is shown as a triangle region 3S mapped on a unit sphere. As is the case with FIG. 5, a region whose parameters $w_i$ are all positive or zeroes is a normalized interpolated region NI.

Letting the template image $\hat{g}$ be set as a certain unit vector, the normalized unit vector $<f>_w$ that has the maximum match with the vector g in the above-mentioned normalized interpolated region is a vector $<f>_w$ given by the parameter $w_i$ (0≤i≤M) that maximizes the normalized correlation value expressed by the following equation:

$$\operatorname*{argmax}_{w_i}(\hat{g}, \langle f \rangle_w), \text{ where } \sum_{i=0}^{M} w_i = 1 \quad (30)$$

The normalized correlation value $(\hat{g}, <f>_w)$ is the following normalized correlation value that is obtained by setting $\overline{<f>}_w[x,y]=0$ and $\bar{g}=0$ and the value in each brace of the denominator at 1 in Eq. (25):

$$\sum_{p,q \in TW} \{\langle f \rangle_w[x', y'] \hat{g}[x', y']\} \equiv (\hat{g}, \langle f \rangle_w)$$

This can be rewritten as follows:

$$(\hat{g}, <f>_w) = \Sigma_j <f>_w[j] \times \hat{g}[j] \quad (31)$$

where j indicates a j-th one of the components of the N-dimensional vector. A parameter $w=(w_0, w_1, \ldots, w_M)$ that maximizes the normalized correlation value $(\hat{g}, <f>_w)$, solved by the method of Lagrange multiplier, is given by the following equation:

$$w \equiv \frac{H^{-1}G}{(n, H^{-1}G)} \quad (32)$$

Here, $$w = [w_0, w_1, \ldots, w_M]^T \quad (33)$$

$$H \equiv \begin{bmatrix} (\hat{f}_0, \hat{f}_0) & (\hat{f}_0, \hat{f}_1) & \cdots & (\hat{f}_0, \hat{f}_M) \\ (\hat{f}_1, \hat{f}_0) & (\hat{f}_1, \hat{f}_1) & \cdots & (\hat{f}_1, \hat{f}_M) \\ \vdots & \vdots & & \vdots \\ (\hat{f}_M, \hat{f}_0) & (\hat{f}_M, \hat{f}_1) & \cdots & (\hat{f}_M, \hat{f}_M) \end{bmatrix} \quad (34)$$

$$G = [(\hat{g}, \hat{f}_0), (\hat{g}, \hat{f}_1), \ldots, (\hat{g}, \hat{f}_M)]^T \quad (35)$$

$$n = [1, 1, \ldots, 1]^T \quad (36)$$

where $^T$ indicates a transposition. The condition for which the normalized interpolated template image $<f>_w$ by the parameter w thus obtained remains in the normalized interpolated region is as follows:

$$0.0 \le w_i \le 1.0 \text{ (for all i's)} \quad (37)$$

When this condition is not satisfied, the solution is at the boundary of the interpolation region, so that the above solution is recursively carried out at a boundary lower by one dimension to complete the solution.

It must be noted here that the maximum normalized correlation value $\max(\hat{g}, <f>_w)$ of the normalized interpolated unit vector $<f>_w$ with respect to the unit vector $\hat{g}$ and its parameter value w are calculated from only a simple relationship between the vertex unit vector normalized correlation value G and the correlation matrix H representing the construction between the vertex vectors.

<Normalization of Template>

The parameter estimation equation (32) is applied to the normalized correlation matching of an image, regarding the reference template image of the pixel size P×Q=N as an N-dimensional vector. Eq. (25) for the normalized correlation is nothing less than the following normalized correlation between the normalized reference template image $\hat{g}$ and a matching region image $\hat{f}[x,y,\theta]$ normalized at the position-angle (x,y,θ) in the search image:

$$\text{corr}[x,y,\theta] = (\hat{g}, \hat{f}[x,y,\theta]) \quad (38)$$

Here, the normalized image $\hat{g}$ of the reference template image g is defined by Eq. (16) given in the first embodiment and satisfies the conditions for normalization defined by Eqs. (17) and (18). Further, the normalized image $\hat{f}[x,y,\theta]$ of the image f at the reference matching position $(x,y,\theta)$ is defined by $$(\bar{f}[x, y, \theta])[p, q] \equiv \frac{f[x', y'] - \bar{f}[x, y, \theta]}{\left\{ \sum_{p,q \in TW} (f[x', y'] - \bar{f}[x, y, \theta])^2 \right\}^{1/2}} \quad (39)$$

and it satisfies the following conditions for normalization:

$$\sum_{p,q \in TW} \hat{f}[x, y, \theta][p, q] = 0.0 \quad (40)$$

$$\sum_{p,q \in TW} \hat{f}[x, y, \theta][p, q]\hat{f}[x, y, \theta][p, q] = 1.0 \quad (41)$$

<Parametric Position Estimation Scheme>

In this second embodiment, the reference matching position (x,y) is shifted in the search image f at intervals of $\Delta x$ (hereinafter referred to as sampling intervals) in the x direction and $\Delta y$ in the y direction. $\Delta X$ and $\Delta y$ are each a predetermined width equal to or greater than one pixel interval. The center of the reference template image g is held at each reference matching position (x,y) and the degree of similarity at this position between the reference template image and the corresponding matching region image on the search image is calculated. The reference matching position will hereinafter be represented by $(x_c, y_c)$.

Figure 11:
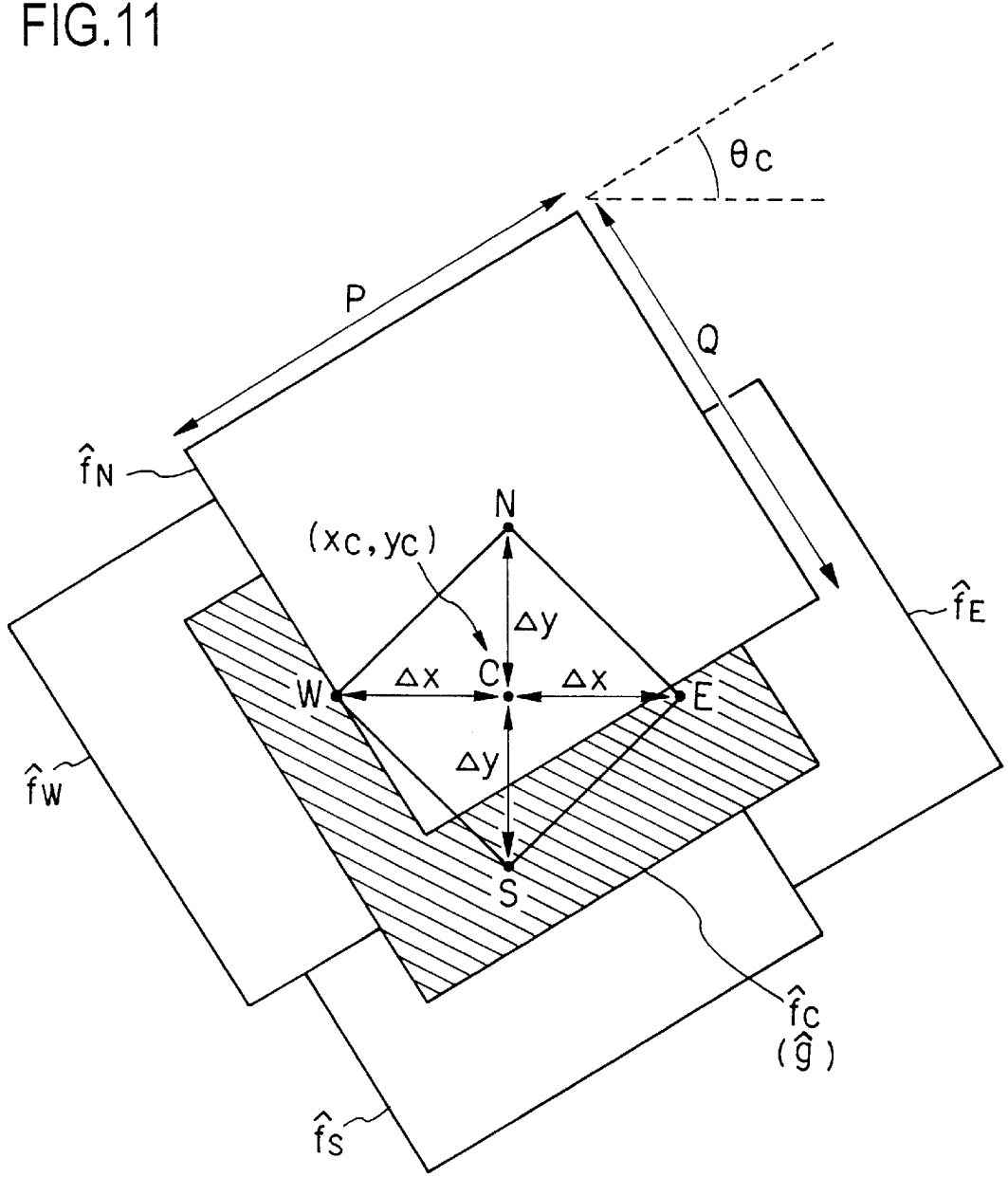
FIG. 11 is a schematic diagram for explaining four neighboring regions in the second embodiment.

As depicted in FIG. 11, the reference template image g is placed with its center held at the position $(x_c, y_c)$ on the search image and at an angle $\theta_c$ thereto. Let $\hat{f}_c[x_c, y_c, \theta_c]$ denote a normalized matching region image of a template size P×Q on the search image f facing the reference template image g and $\hat{f}_N[x_c, y_c, \theta_c]$, $\hat{f}_S[x_c, y_c, \theta_c]$, $\hat{f}_W[x_c, y_c, \theta_c]$ and $\hat{f}_E[x_c, y_c, \theta_c]$ denote region images of the same template size and the same inclination, defined at positions shifted $\Delta x$ and $\Delta y$ from the matching region image $f_c$ in vertical and horizontal directions, respectively. That is, the matching regions are set as given below using $\Delta x$ and $\Delta y$ as sampling intervals in the x and y directions.

$$\hat{f}_C = \hat{f}[x_c, y_c, \theta_c] \quad (42)$$

$$\hat{f}_N = \hat{f}[x_c, y_c + \Delta y, \theta_c] \quad (43)$$

$$\hat{f}_S = \hat{f}[x_c, y_c - \Delta y, \theta_c] \quad (44)$$

$$\hat{f}_W = \hat{f}[x_c - \Delta x, y_c, \theta_c] \quad (45)$$

$$\hat{f}_E = \hat{f}[x_c + \Delta x, y_c, \theta_c] \quad (46)$$

Then, a search is made for position in a quadrangle region $\overline{NESW}$ where the normalized correlation with the reference template image g is high. This can be done as described below based on the idea of normalized interpolation of the unit vector.

Figure 12:
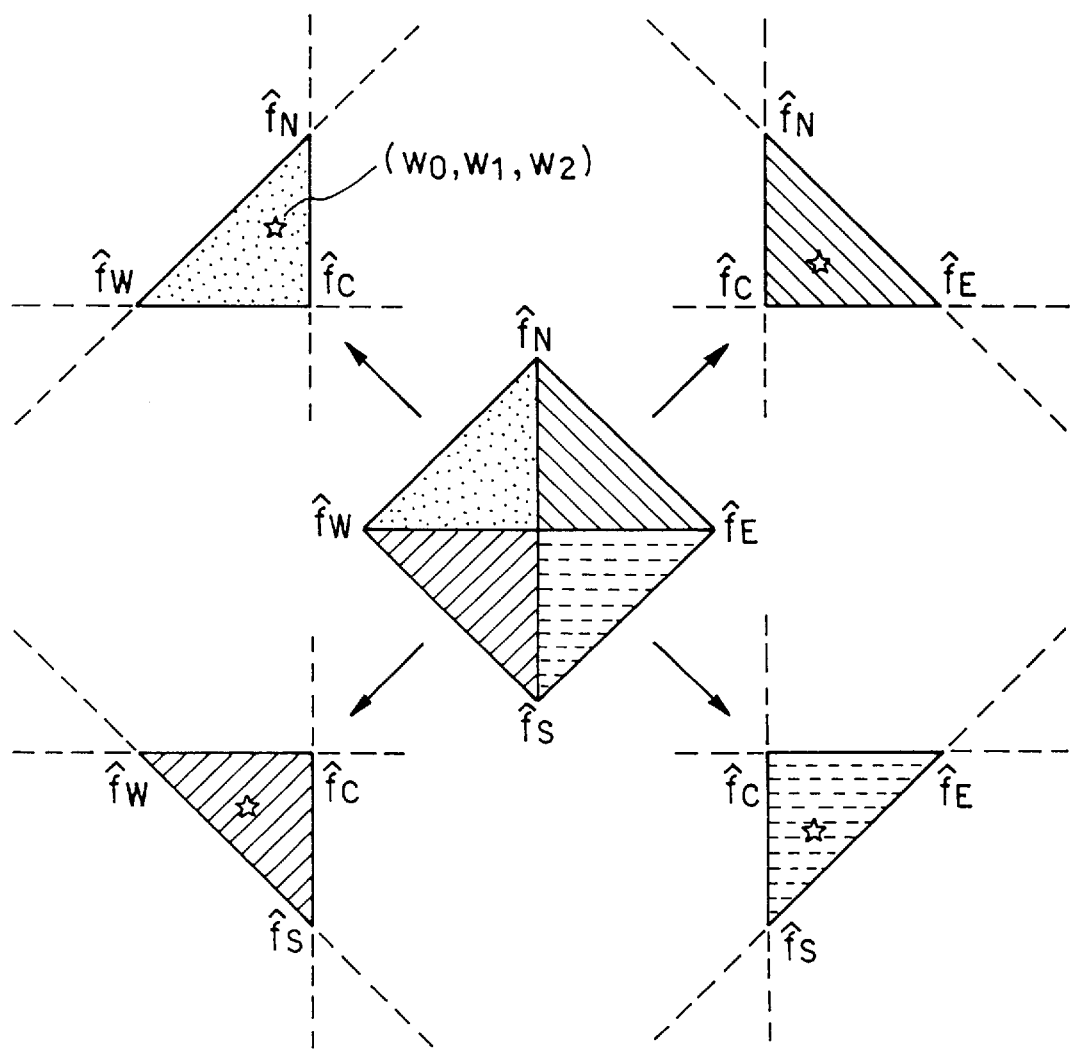
FIG. 12 is a schematic diagram for explaining a parametric template scheme in the four neighboring regions in the second embodiment.

In the first place, the quadrangle region $\overline{NESW}$ is split into four triangle regions $\overline{NEC}, \overline{ESC}, \overline{SWC}$ and $\overline{WNC}$ as shown in FIG. 12. For each triangle region a parametric template image $<f^{TR}>_{W(TR)}$, which has its vertex templates defined by matching region images using the three corners of the triangle region as reference matching positions is defined as follows:

$$\langle f^{TR} \rangle_{w(TR)}[p, q] \equiv \frac{\sum_{k \in TR} w(TR)_k \hat{f}_k[p, q]}{\left\| \sum_{k \in TR} w(TR)_k \hat{f}_k \right\|} \quad (47)$$

where TR indicates any one of the triangle regions $\overline{NEC}$, $\overline{ESC}$, $\overline{SWC}$ and $\overline{WNC}$ and $$\sum_{k \in TR}$$

represents the summation of three angles of the triangle region. For example, when TR indicates the triangle $\overline{NEC}$, k in $$\sum_{k \in TR}$$

is N,E or C. This parametric template is considered as a two-dimensional representation of a template in the region expanded by vertex templates.

Incidentally, because of the normalization property of the normalized matching region image $\hat{f}$ (Eqs. (40) and (41)), the parametric template $<f^{TR}>_{W(TR)}$ also satisfies the conditions for normalization defined by the following equations.

$$\sum_{p,q \in TW} \langle f^{TR} \rangle_{w(TR)}[p, q] = 0.0 \quad (48)$$

$$\sum_{p,q \in TW} \langle f^{TR} \rangle_{w(TR)}[p, q] \times \langle f^{TR} \rangle_{w(TR)}[p, q] = 1.0 \quad (49)$$

Since the image of the template size P×Q that satisfies the conditions for normalization can be regarded as a unit vector in the space of the image-size dimension, the parameter w that maximizes the normalized correlation between the parametric template image $<f^{TR}>_{W(TR)}$ and the reference template image g and the normalized correlation value can easily be calculated by the parameter estimation equation (32) from normalized correlation values of the vertex templates.

Then, Eq. (32) is used to calculate the parameter w that maximizes the normalized correlation $(\hat{g}, <f^{TR}>_{w(TR)})$ between the parametric template image $<f^{TR}>_{W(TR)}$ and the reference template image g, and an estimated position $(x_s, y_s)$ where the similarity is maximum is determined from the value of the parameter as follows:

In the region $\overline{NEC}$:

$$x_s = w(\overline{NEC})_C x_c + w(\overline{NEC})_N x_c + w(\overline{NEC})_E (x_c + \Delta x) \quad (50)$$

$$y_s = w(\overline{NEC})_C y_c + w(\overline{NEC})_N (y_c + \Delta y) + w(\overline{NEC})_E y_c \quad (51)$$

In the region $\overline{ESC}$:

$$x_s = w(\overline{ESC})_C x_c + w(\overline{ESC})_S x_c + w(\overline{ESC})_E (x_c + \Delta x) \quad (52)$$

$$y_s = w(ESC)_C y_c + w(\overline{ESC})_S (y_c - \Delta y) + w(\overline{ESC})_E y_c \quad (53)$$

In the region $\overline{SWC}$:

$$x_s = w(\overline{SWC})_C x_c + w(\overline{SWC})_S x_c + w(\overline{SWC})_W (x_c - \Delta x) \quad (54)$$

$$y_s = w(\overline{SWC})_C y_c + w(\overline{SWC})_S (y_c - \Delta y) + w(\overline{SWC})_W y_c \quad (55)$$

In the region $\overline{WNC}$:

$$x_s = w(\overline{WNC})_C x_c + w(\overline{WNC})_N x_c + w(\overline{WNC})_W (x_c - \Delta x) \qquad (56)$$

$$y_s = w(\overline{WNC})_C y_c + w(\overline{WNC})_N (y_c + \Delta y) + w(\overline{WNC})_W y_c \qquad (57)$$

The normalized correlation values are compared in the four triangle regions. The position $(x_s, y_s)$ of the triangle region that provides the maximum normalized correlation value and this normalized correlation value are regarded as an estimated position where the search image has the highest degree of similarity to the reference template image in the quadrangle region NESW and as the normalized correlation value at that time.

<Parametric Angle Estimation Scheme>

Now, let a normalized image of the template size at the position $(x_s, y_s)$ and tilted at an angle $\theta_c$ on the search image be represented by $\hat{f}_c[x_s, y_s, \theta_c]$ and normalized images displaced apart therefrom by a rotation angle $\Delta\theta$ in plus and minus direction be represented by $\hat{f}_L[x_s, y_s, \theta_c]$ and $\hat{f}_R[x_s, y_s, \theta_c]$, respectively. That is, the images are set as given below using $\Delta\theta$ as the rotational angular distance:

$$\hat{f}_C = \hat{f}[x_s, y_s, \theta_c] \qquad (58)$$

$$\hat{f}_L = \hat{f}[x_s, y_s, \theta_c - \Delta\theta] \qquad (59)$$

$$\hat{f}_R = \hat{f}[x_s, y_s, \theta_c + \Delta\theta] \qquad (60)$$

Figure 13:
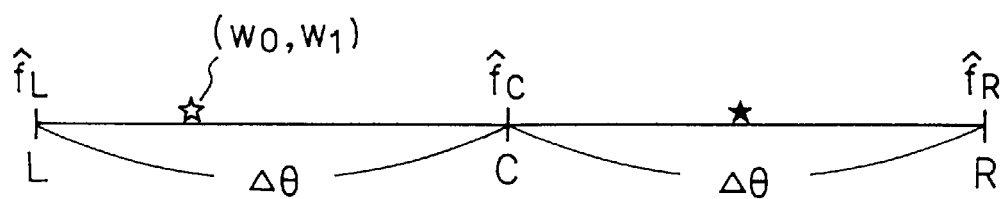
FIG. 13 is a schematic diagram for explaining the parametric template scheme in a two-neighbor line segment region in the second embodiment.

Then, a search is made for a position in a line segment $\overline{RCL}$, shown in FIG. 13, where the normalized correlation with the reference template image g is high.

In the first place, the line segment $\overline{RCL}$ is split into two line segments $\overline{RC}$ and $\overline{CL}$ as shown in FIG. 13. For each line segment a parametric template $<f^{LR}>_{w(LR)}$, which has its terminal templates (hereinafter referred to as vertex templates) defined by terminals of the segment is defined as follows:

$$\langle f^{LR}\rangle_{w(LR)}[p, q] \equiv \frac{\sum_{k \in LR} w(LR)_k \hat{f}_k[p, q]}{\left\|\sum_{k \in LR} w(LR)_k \hat{f}_k\right\|} \qquad (61)$$

where LR indicates either one of the line segments $\overline{RC}$ and $\overline{CL}$ and $$\sum_{k \in LR}$$

represents the summation over the vertices. For example, when LR indicates the line segment $\overline{RC}$, k in $$\sum_{k \in LR}$$

is R or C. This parametric template is considered as a one-dimensional representation of a template in the region expanded by vertex templates.

Incidentally, because of the normalization property of the normalized matching region image $\hat{f}$ (Eqs. (40) and (41)), the parametric template image $<f^{LR}>_{w(LR)}$ also satisfies the conditions for normalization. Then, Eq. (32) is used to calculate a parameter w(LR) that maximizes the normalized correlation $(\hat{g}, <f^{LR}>_{w(LR)})$ between the parametric template image $<f^{LR}>_{w(LR)}$ and the reference template image g, and the rotation angle $\theta_s$ is determined from the value of the parameter as follows:

In the line segment $\overline{RC}$:

$$\theta_s = w(\overline{RC})_C \theta_c + w(\overline{RC})_R (\theta_c + \Delta\theta) \qquad (62)$$

In the line segment $\overline{CL}$:

$$\theta_s = w(\overline{CL})_C \theta_c + w(\overline{CL})_L (\theta_c - \Delta\theta) \qquad (63)$$

The normalized correlation values are matched in the two line segments. The angle of the line segment that provides the maximum normalized correlation value and this normalized correlation value are regarded as an estimated angle and as the normalized correlation value at that time.

<Parametric Position-Angle Estimation>

The aforementioned parametric position estimation scheme and parametric angle estimation scheme are sequentially used to estimate the position and angle by the parametric template method. That is, the algorithm of the parametric position-angle estimation scheme comprises the following steps of:

(1) Constructing a quadrangle region with its center at a given reference comparison position $(x_c, y_c)$ and having opposed corners at positions displaced $\Delta x$ and $\Delta y$ from the center in horizontal and vertical directions, respectively;

(2) Calculating normalized correlations between vertex templates and the reference template for each of four triangle regions into which the quadrangle region is split by two diagonal lines and calculating a position-estimated value $(x_s, y_s)$ based on the calculated normalized correlation values;

(3) Constructing a line segment that is determined by $\Delta\theta$ displaced from a given angle $\theta_c$ at the estimated position $(X_s, y_s)$;

(4) Calculating the normalized correlations between vertex templates of the line segment and the reference template and calculating an angle-estimated value $\theta_s$ based on the normalized correlations and calculating the normalized correlation value at the estimated angle; and (5) Determining the normalized correlation value in step (4) as a normalized correlation value by the position-angle estimation, using $(x_s, y_s)$ by the position estimation and $\theta_s$ by the angle estimation as position-angle estimated values.

Concrete Example

A description will be given, with reference to FIGS. 14 through 17 and 18 through 25, of a concrete procedure involved in this second embodiment. The second embodiment is intended to quickly find out, with subpixel accuracy, the position and angle in the search image f at which it has the highest degree of similarity to the reference template image g.

Figure 14:
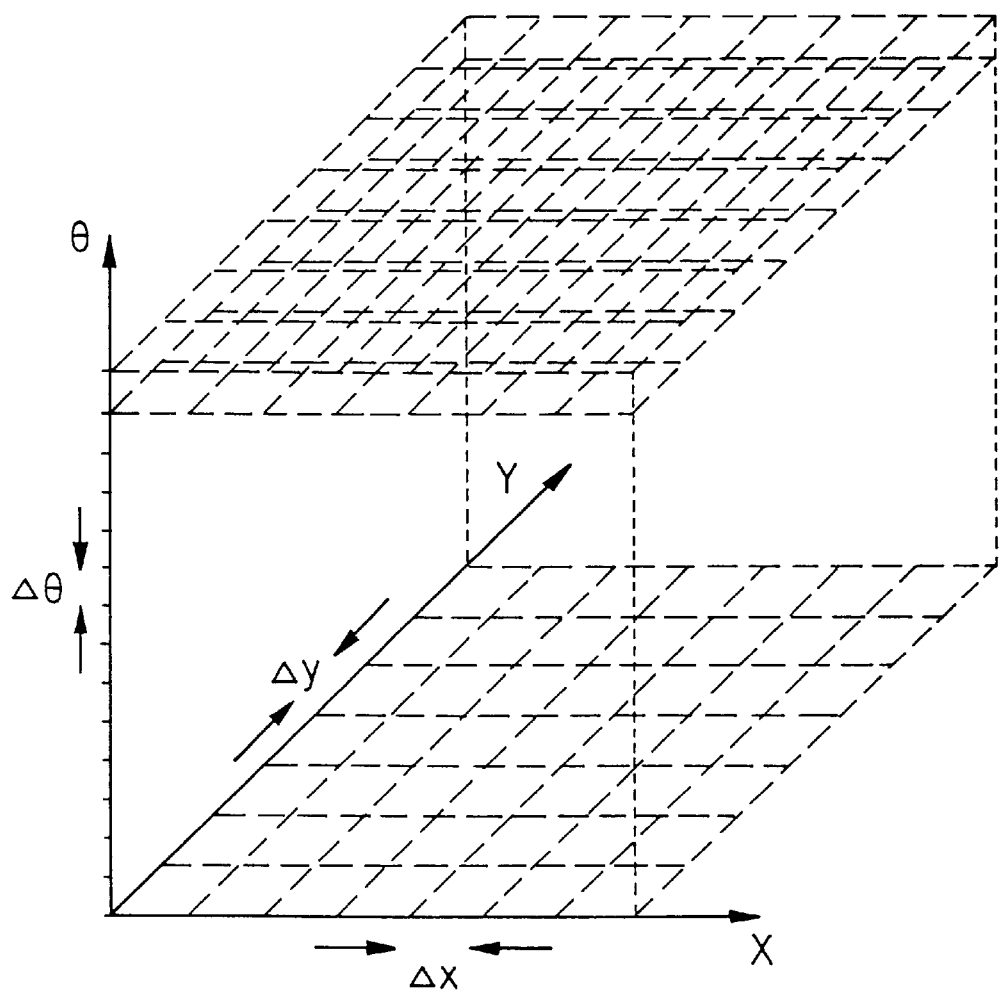
FIG. 14 is a schematic diagram for explaining a coarse search lattice in a concrete example of the second embodiment.
Figure 15A:
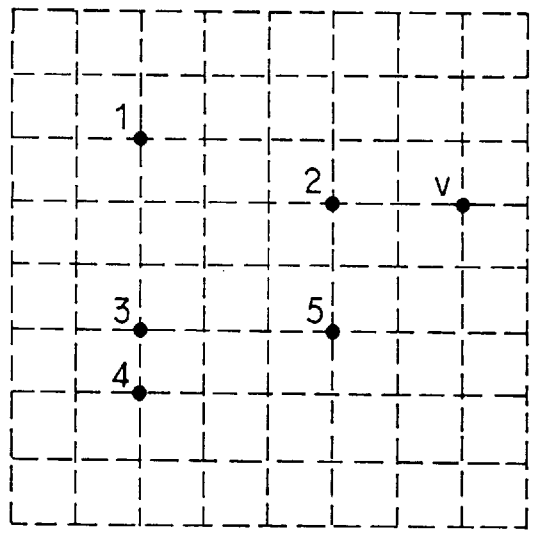
FIG. 15A is a schematic diagram for explaining the selection of v candidates for a coarse search in the concrete example of the second embodiment.
Figure 15B:
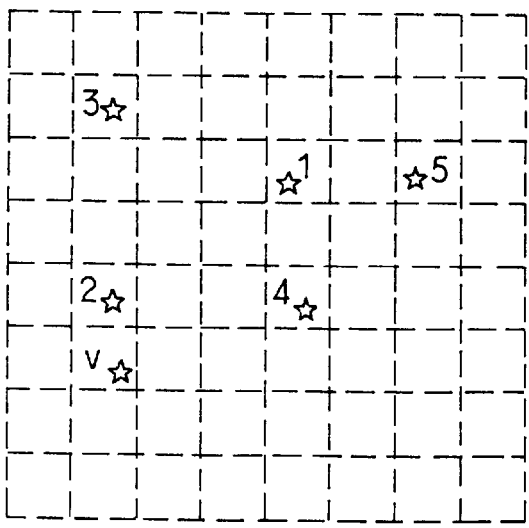
FIG. 15B is a schematic diagram for explaining the selection of v candidates for a fine search in the concrete example of the second embodiment.
Figure 18:
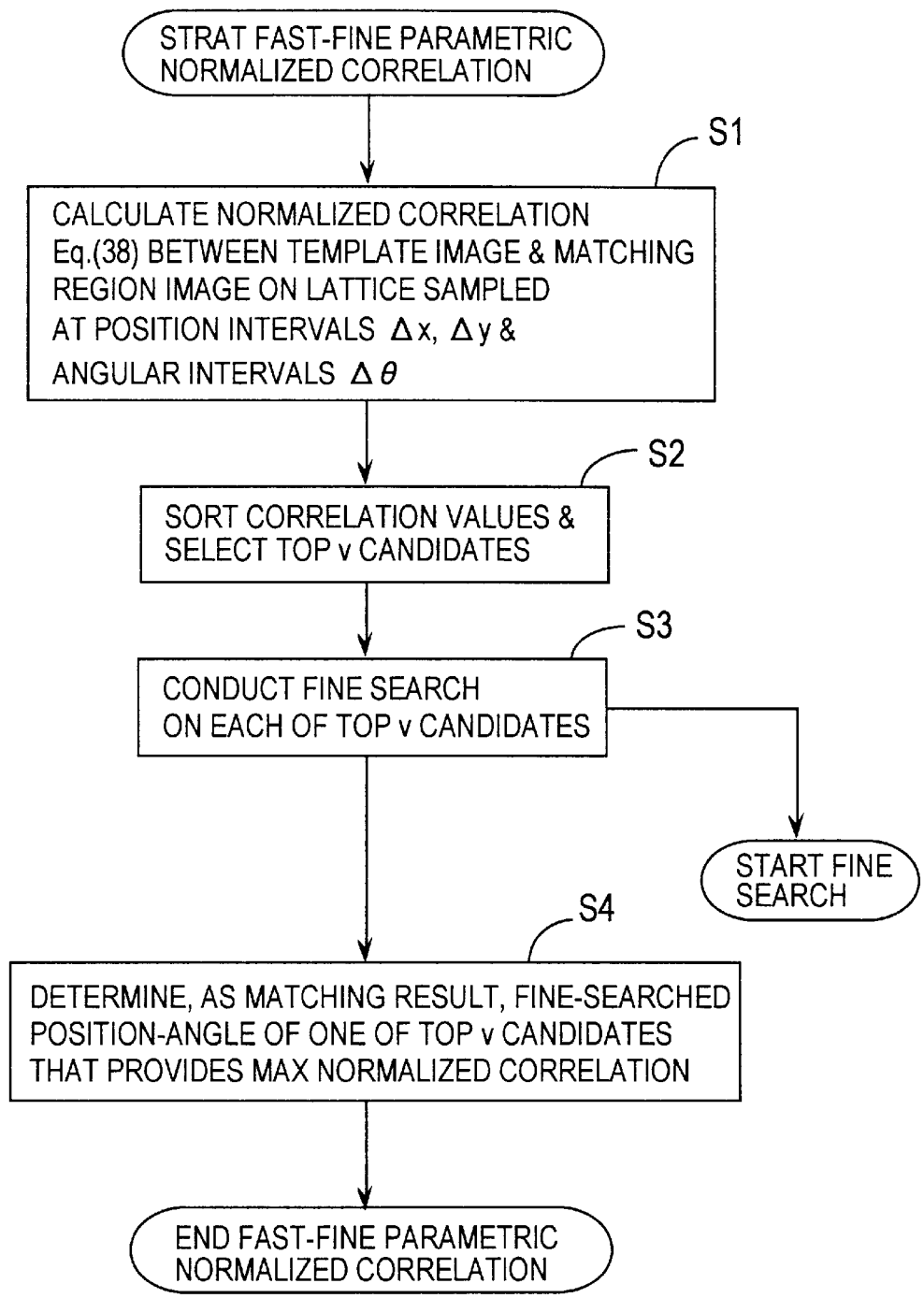
FIG. 18 is a flowchart of fast, high precision parametric normalized correlation processing in the concrete example of the second embodiment.

The outline of the fast, high precision parametric normalized correlation method will be described in respect of FIG. 18. In the first place, consider a lattice sampled at position quantizing intervals (of 10 pixels, for instance) $\Delta x$ and $\Delta y$ and angle quantizing intervals (of $2\pi/100$, for instance) $\Delta\theta$ as shown in FIG. 14. In step S1 Eq. (38) is used to calculate normalized correlations between the reference template image g translated and rotated by the spacing of the lattice points and the search image at those positions and angles. In step S2, as shown in FIG. 15A, the thus obtained normalized correlation values are sorted, from which v candidates for fine search are selected in descending order of value. In step S3 fine search of the v candidates is performed to obtain positions and angles estimated with subpixel accuracy and corresponding normalized correlation values as shown in FIG. 15B. In step S4 the position and angle at which the maximum one of the normalized correlation values is provided is obtained as an estimated position and angle.

Figure 19:
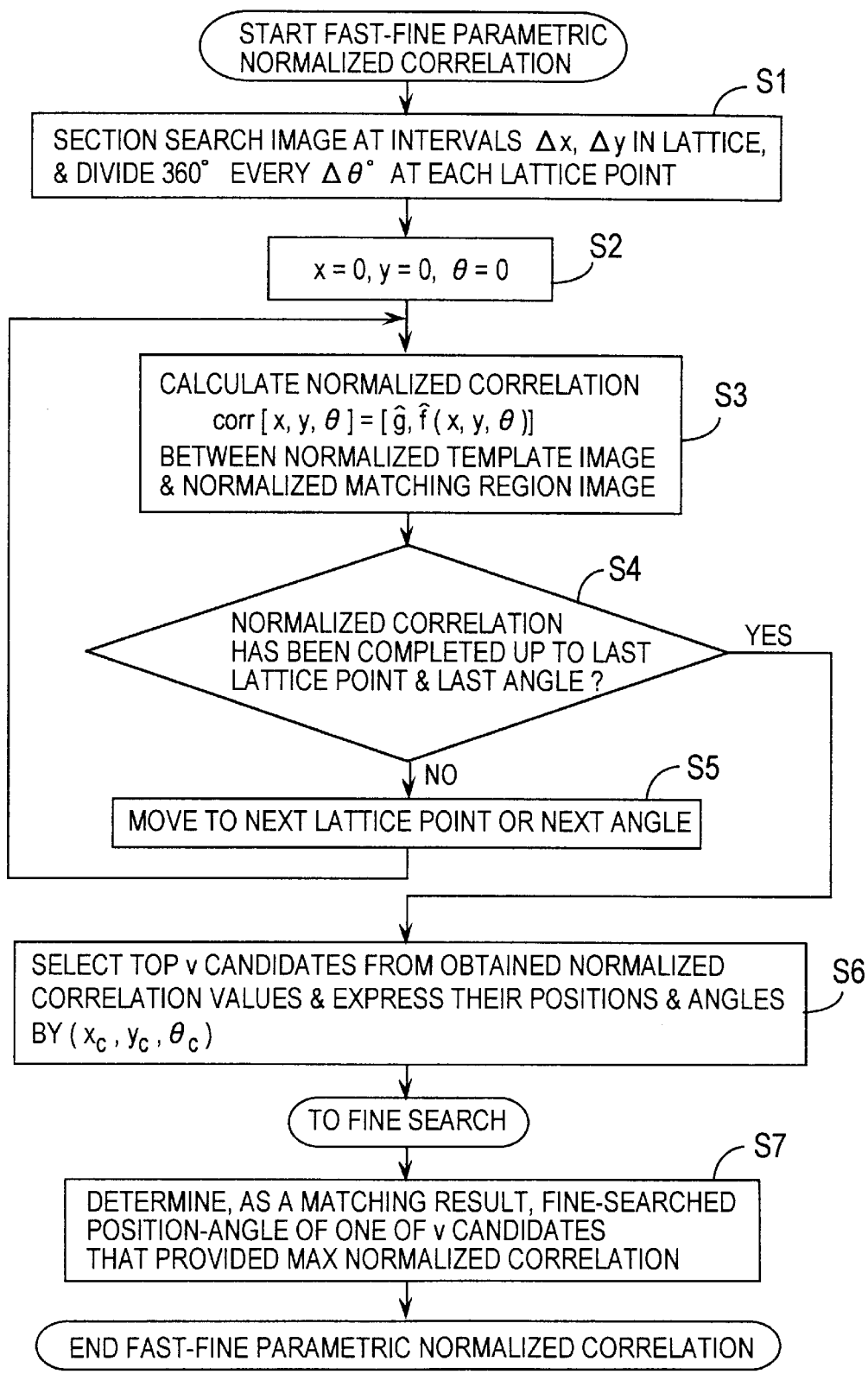
FIG. 19 is a flowchart illustrating in detail the fast, high precision parametric normalized correlation processing shown in FIG. 18.

The fast, high accuracy parametric normalized correlation method will be described in detail with respect to FIG. 19. In step S1 the search image is partitioned into a lattice form at intervals of $\Delta x$ and $\Delta y$ in horizontal and vertical directions, respectively, and at each lattice point, 360° is divided at intervals of $\Delta\theta$. After initializing x=0, y=0 and $\theta$=0 in step S2, a normalized correlation corr[x,y,$\theta$] between the normalized template image and the normalized search image is calculated by Eq. (38) in step S3. In step S4 it is checked whether the normalization has been completed at all the lattice points and in all the directions. If not, the template image is shifted to the next lattice point or in the direction of the next angle in step S5, then the procedure returns to step S3, and steps S3, S4 and S5 are carried out again. This normalized correlation is performed until the last lattice point and the direction of the last angle are reached. In step S6, top v candidates are selected from the thus obtained normalized correlation values and the positions and angles of the template images corresponding to the selected v candidates are expressed by $x_c$, $y_c$ and $\theta_c$. In step S7 a fine search of these top v candidates is made to obtain positions and angles estimated with subpixel accuracy and the corresponding normalized correlation values, and the position and angle corresponding to the maximum one of the normalized correlation values are selected.

The fine search is made by repeating the parametric position-angle estimation using given intervals $\Delta x, \Delta y$ and $\Delta\theta$ and candidate positions and angles $x_c$, $y_c$ and $\theta_c$.

Figure 16:
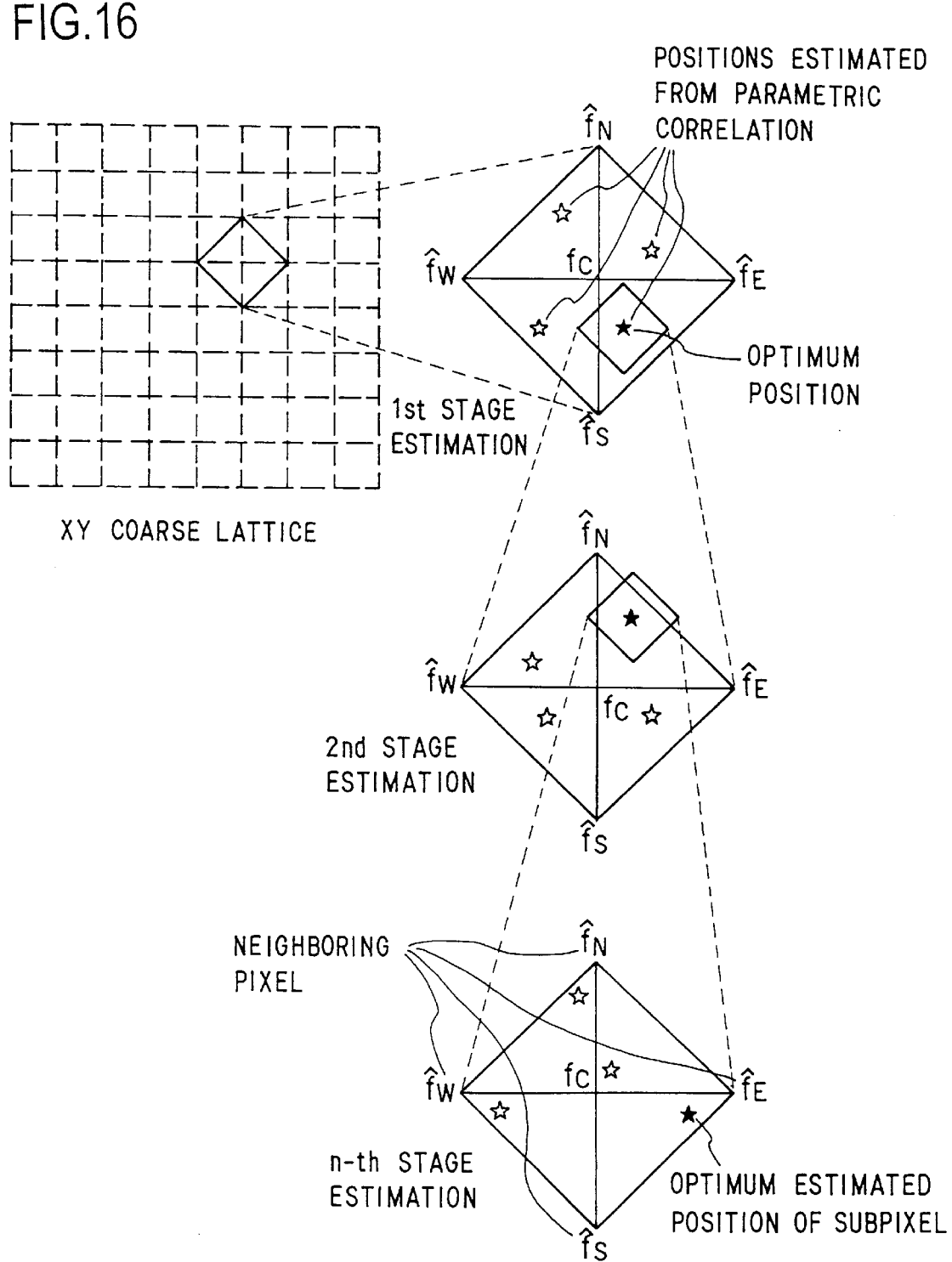
FIG. 16 is a schematic diagram for explaining a fine position search process in the concrete example of the second embodiment.
Figure 20:
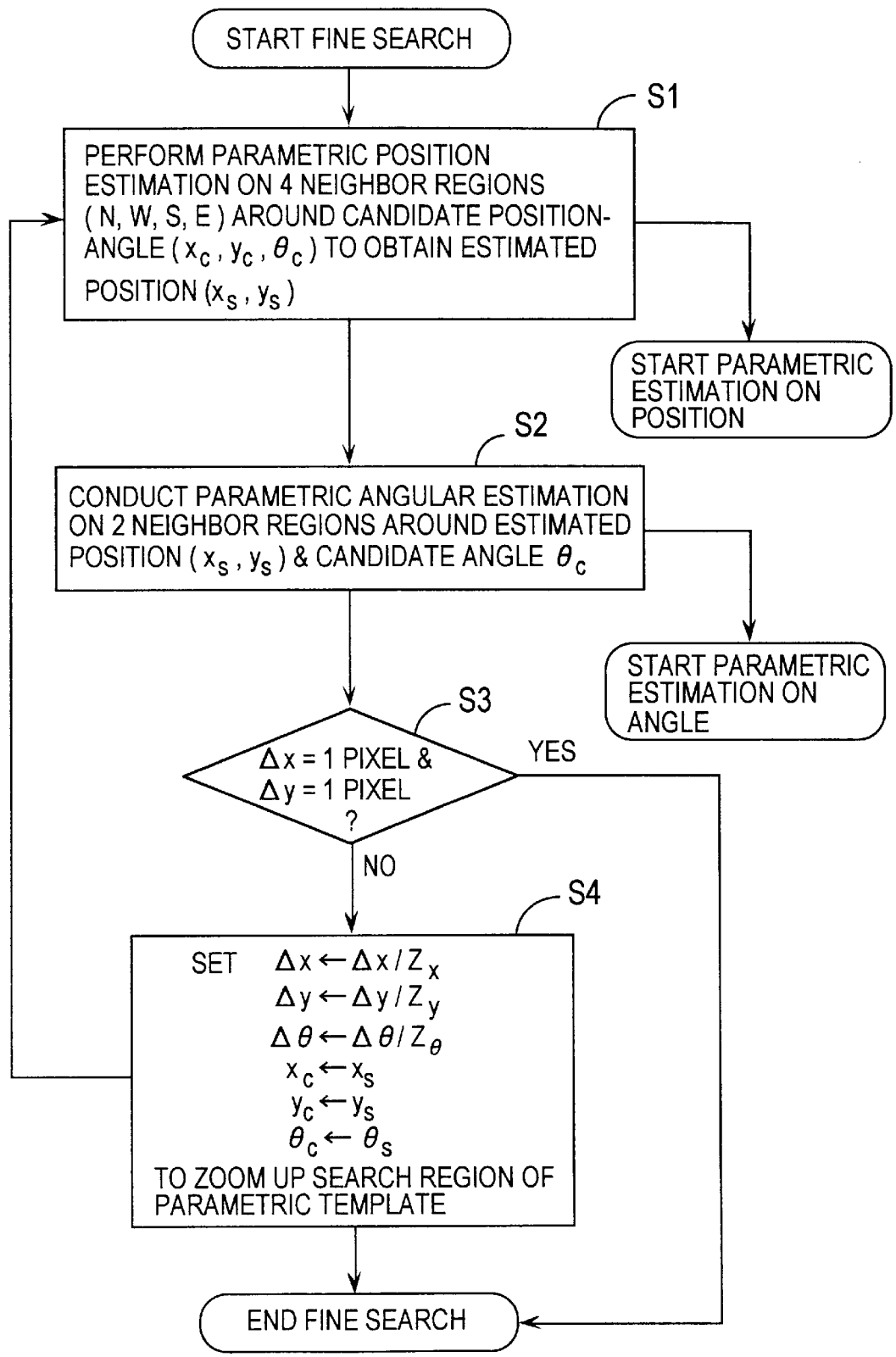
FIG. 20 is a flowchart of fine search processing in the concrete example of the second embodiment.

As shown in FIG. 20, the fine search begins with a parametric position estimation that is performed in step S1 for each of four neighbor regions (N,W,S,E) shifted $\Delta x$ and $\Delta y$ from a candidate position ($x_c,y_c$), thereby obtaining an estimated position ($x_s,y_s$) (indicated by asterisks in a first estimation step in FIG. 16). Then, normalized correlation values at the four estimated positions are calculated and the position where the maximum one of the correlation values is provided is selected as the first-step estimated position ($x_s,y_s$) (indicated by the black asterisk). Next, in step S2 a parametric angle estimation is performed for two neighbor line segments provided by two angles shifted $\Delta\theta$ from the candidate angle $\theta_c$ to obtain estimated angles $\theta_s$ (indicated by asterisks in a first estimation step in FIG. 17), then normalized calculation values at the respective estimated angles are calculated, and the angular position where the maximum correlation value is provided is selected as a first-step estimated angle $\theta_s$ (indicated by the black asterisk). In this way, the estimated position-angle ($x_s,y_s,\theta_s$) by the first estimation step is determined.

Thereafter, in step S3 it is checked whether $\Delta x$ and $\Delta y$ are smaller than one pixel size; if so, the fine search is finished. If they are larger than one pixel size, the procedure goes to step S4, in which the first-step estimated position and angle ($x_s,y_s$, and $\theta_s$) determined as described above are used to update $\Delta x$, $\Delta y$, $\Delta\theta$, $x_c$, $y_c$ and $\theta_c$ as follows:

$\Delta x \leftarrow \Delta x/Z_x$ (64)

$\Delta y \leftarrow \Delta y/Z_y$ (65)

$\Delta\theta \leftarrow \Delta\theta/Z_\theta$ (66)

$x_c \leftarrow x_s$ (67)

$y_c \leftarrow y_s$ (68)

$\theta_c \leftarrow \theta_s$ (69)

Figure 17:
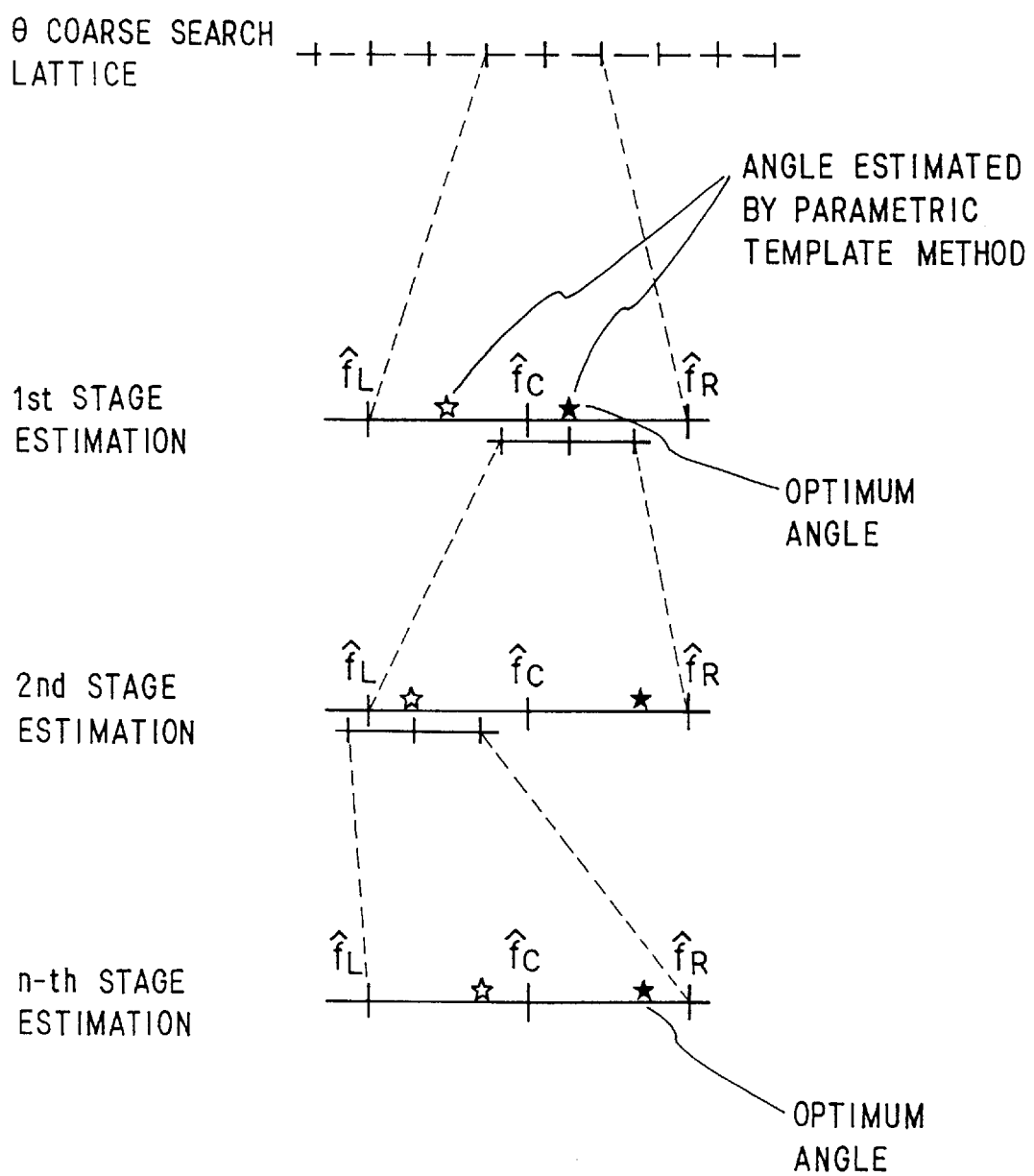
FIG. 17 is a schematic diagram for explaining a fine angle search process in the concrete example of the second embodiment.

The reduction ratios $Z_x$, $Z_y$ and $Z_\theta$ are set at positive values larger than unity. By this updating, the search region of the parametric template is reduced about an optimum position and angle (indicated by black asterisks) as shown in FIGS. 16 and 17, after which the procedure goes back to step S1 and the same processes of steps S1 through S4 as described above are repeatedly carried out to make second-step, . . . , (N-th)-step estimations until $\Delta x$ and $\Delta y$ become smaller than one pixel size.

Figure 21:
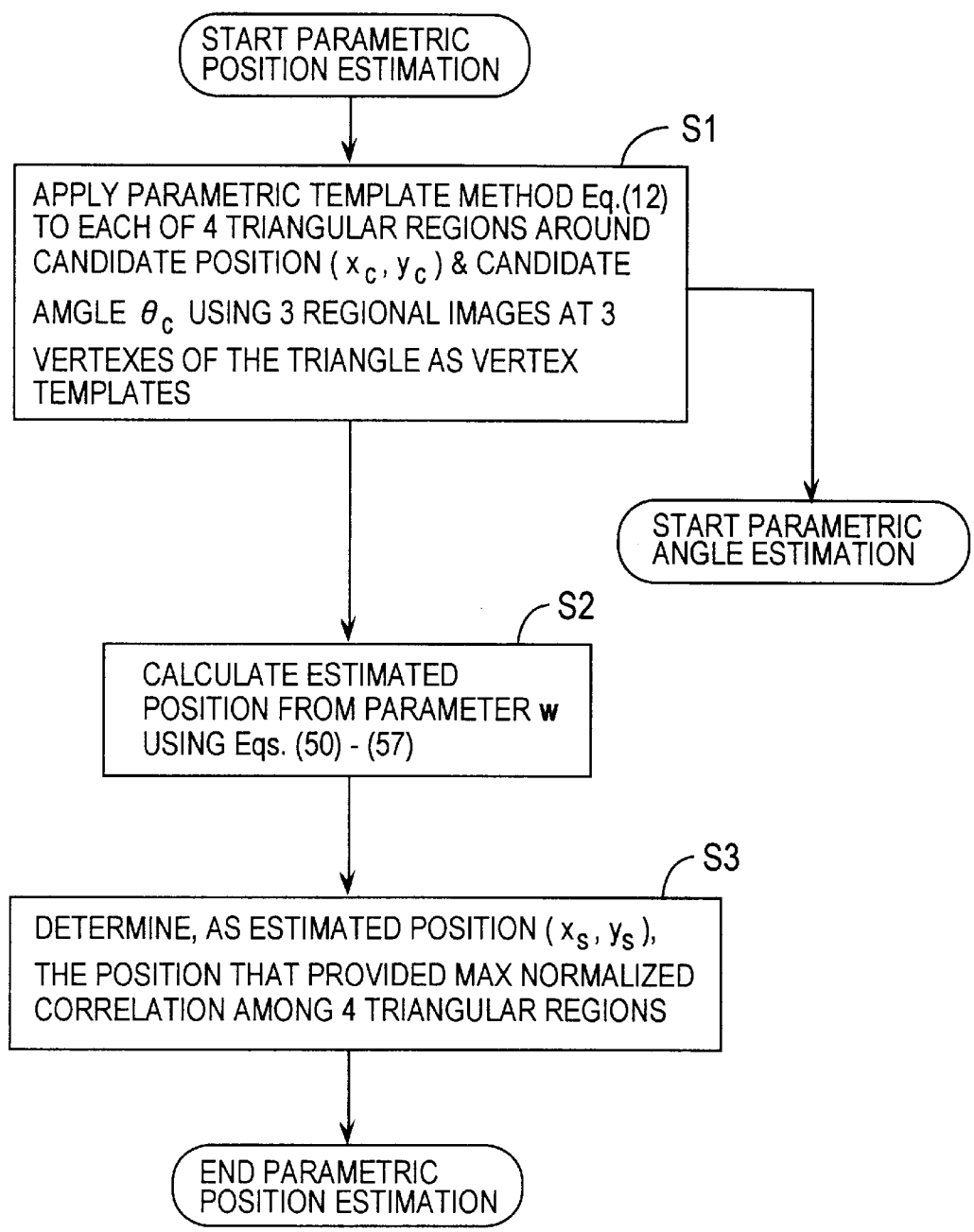
FIG. 21 is a flowchart of parametric position estimation processing in the concrete example of the second embodiment.
Figure 23:
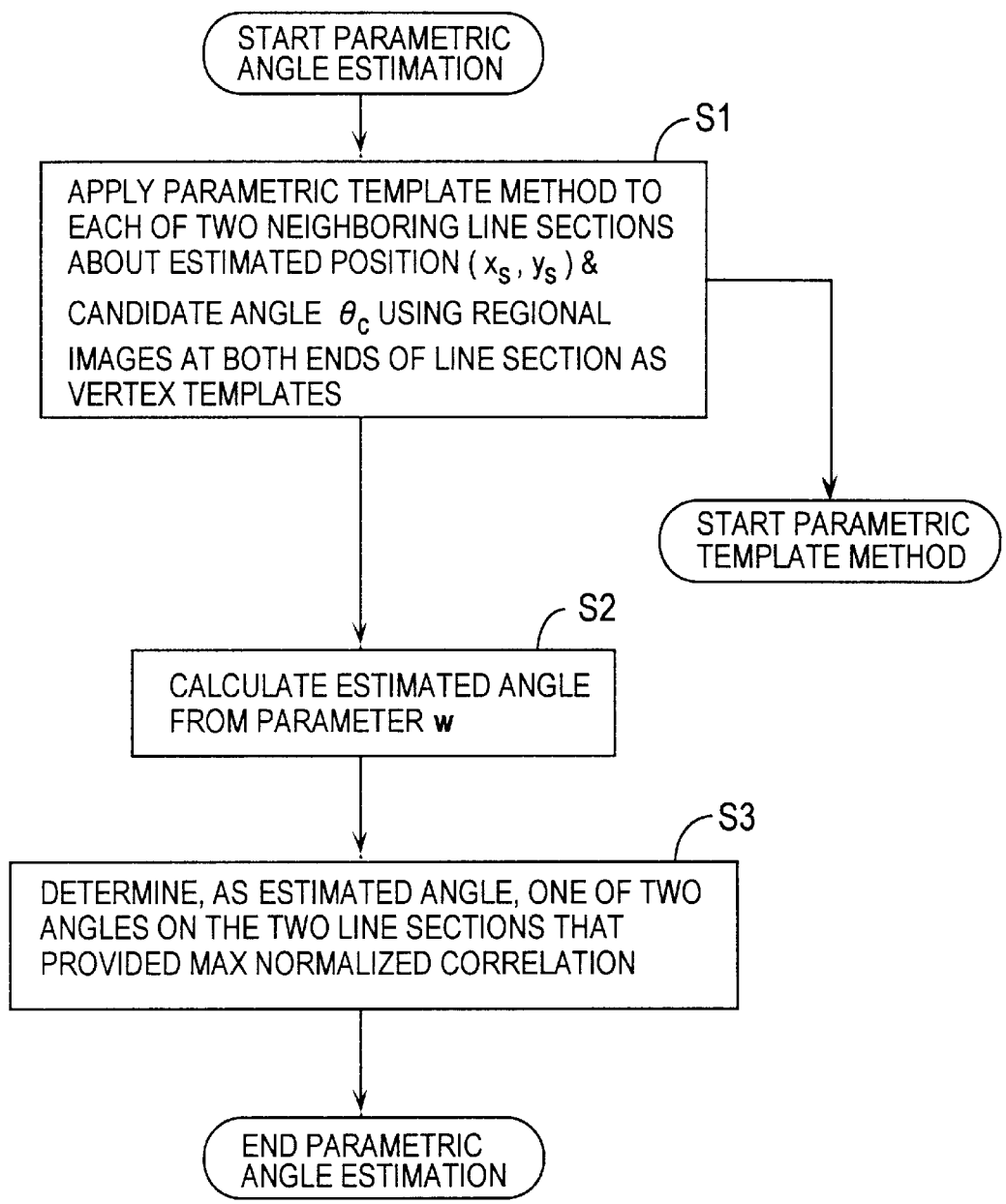
FIG. 23 is a flowchart of parametric angle estimation processing in the concrete example of the second embodiment.

Turning now to FIGS. 21 and 23, the outline of the above parametric position-angle estimation will be described below. In step S1 shown in FIG. 21, for each of four neighbor triangle regions of the candidate positions ($x_c,y_c$) and candidate angles $\theta_c$, parameters are estimated using vertices of the triangle regions as vertex templates by the parametric template method following the procedure depicted in FIG. 25, and in step S2 four estimated positions ($x_s,y_s$) are calculated by Eqs. (50) through (57). Next, in step S3 that one of the four estimated positions where the maximum normalized correlation is provided is selected as an estimated position ($x_s,y_s$) of this quadrangle region.

Figure 25:
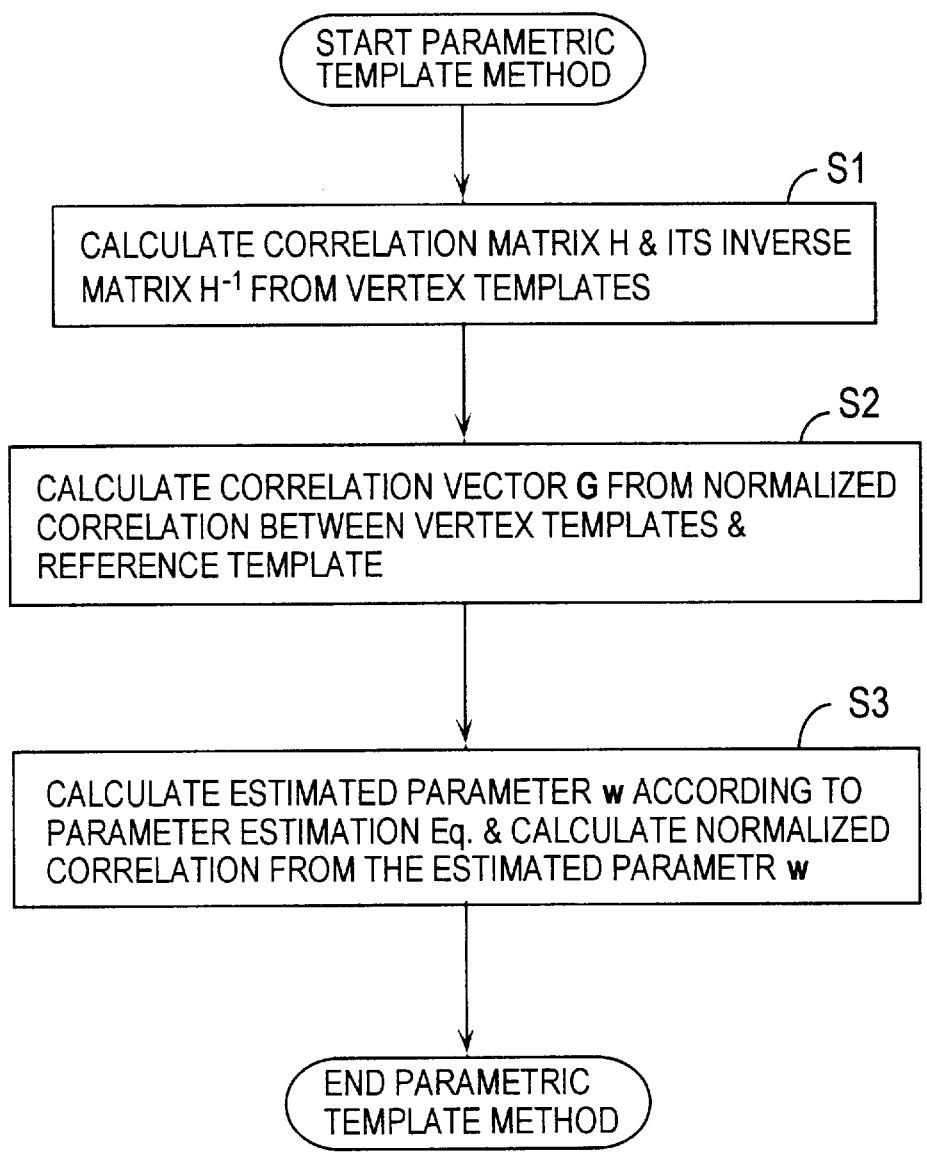
FIG. 25 is a flowchart illustrating the parametric template scheme in the second embodiment.

Next, in step S1 shown in FIG. 23, for each of two neighbor line segments defined by the positions ($x_s,y_s$) estimated as described above, candidate angles $\theta_c$ and the angular distance $\Delta\theta$, parameters are estimated using terminals of the line segments as vertex templates by the parametric template method following the procedure depicted in FIG. 25, and in step S2 two estimated angles $\theta_s$ are calculated by Eqs. (62) and (63). Next, in step S3 that one of the two estimated angles where the maximum normalized correlation is provided is selected as an estimated angle $\theta_s$ of this line segment. This normalized correlation value is used as a normalized correlation value by the parametric position-angle estimation.

Figure 22:
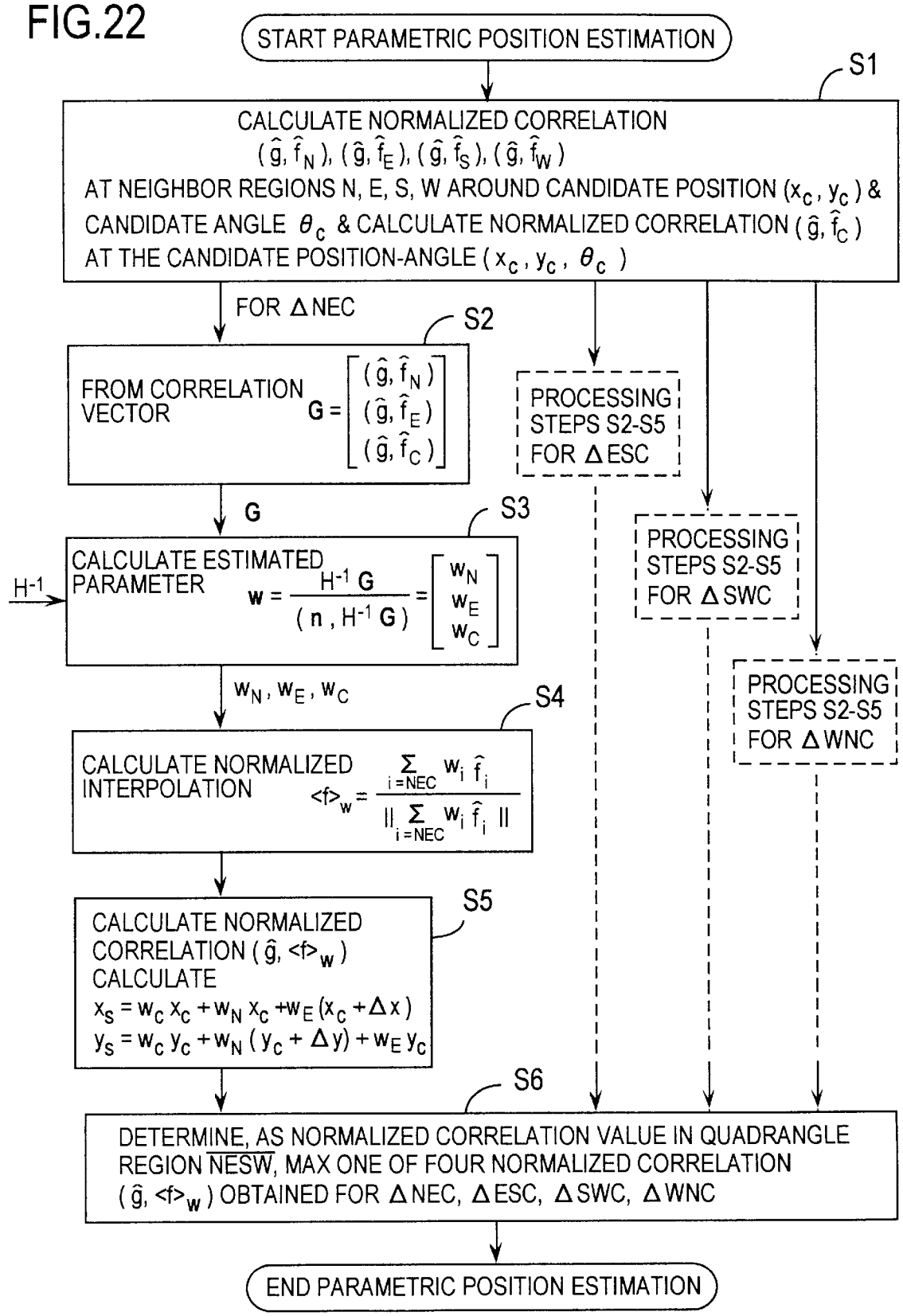
FIG. 22 is a detailed flowchart of the parametric position estimation processing depicted in FIG. 21.
Figure 24:
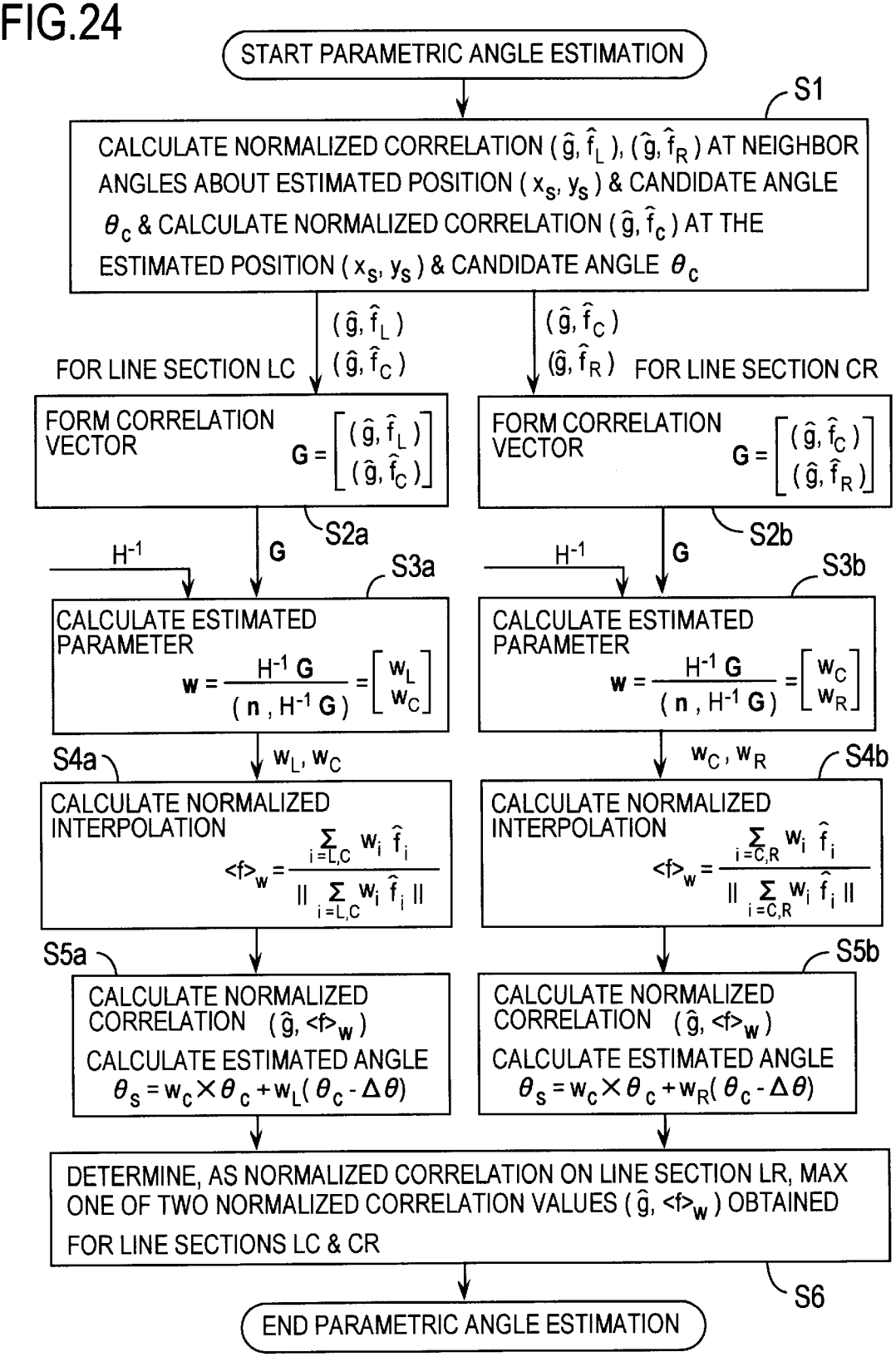
FIG. 24 is a detailed flowchart of the parametric angle estimation processing depicted in FIG. 23.

Referring to FIGS. 22 and 24, such a parametric position-angle estimation will be described below in detail. As depicted in FIG. 22, the parametric position estimation starts with step S1 of calculating normalized correlations ($\hat{g},\hat{f}_N$), ($\hat{g},\hat{f}_E$), ($\hat{g},\hat{f}_S$), ($\hat{g},\hat{f}_W$) in four neighbor regions N, E, S, W at the candidate position ($x_c,y_c$) with the candidate angle $\theta_c$ and a normalized correlation ($\hat{g},\hat{f}_c$) at the candidate position ($x_c,y_c$) with the candidate angle $\theta_c$. In step S2 the following correlation vector G is completed for a triangle region $\Delta$NEC which is one of the four neighbor regions:

$$G = \begin{bmatrix} (\hat{g}, \hat{f}_N) \\ (\hat{g}, \hat{f}_E) \\ (\hat{g}, \hat{f}_C) \end{bmatrix} \quad (70)$$

In step S3 the inverse correlation matrix $H^{-1}$ is substituted into the following equation (71) to derive estimated parameters:

$$w = \frac{H^{-1}G}{(n, HG)} = [w_N, w_E, w_C]^T \quad (71)$$

In step S4 the parameters $W_N$, $W_E$ and $W_C$ thus obtained are substituted into the following equation to obtain a normalized interpolated template image $<f>_w$:

$$\langle f \rangle_w \equiv \sum_{k=N,E,C} w_k \hat{f}_k \bigg/ \bigg\| \sum_{k=N,E,C} w_k \hat{f}_k \bigg\|$$

In step S5 a normalized correlation $(\hat{g}, \langle f \rangle_w)$ is obtained from the normalized interpolated template image $\langle f \rangle_w$, and in step S6 an estimated position $(x_s, y_s)$ is obtained by Eqs. (50) and (51) with respect to the region $\Delta$NEC. By the same processing of steps S1 through S6, the normalized interpolated template image and the estimated position are obtained also for each of the other three triangle regions $\Delta$ESC, $\Delta$SWC and $\Delta$WNC. That one of the four estimated positions at which the maximum normalized correlation value is provided is determined as the estimated position $(x_s, y_s)$ of the quadrangle region $\overline{\text{NESW}}$.

As shown in FIG. 24, the parametric angle estimation starts with step S1 of calculating normalized correlations $(\hat{g}, \hat{f}_L)$ and $(\hat{g}, \hat{f}_R)$ at angles $\pm \Delta\theta$ displaced from the candidate angle $\theta_c$ at the estimated position $(x_s, y_s)$ and a normalized correlation $(\hat{g}, \hat{f}_c)$ at the candidate angle $\theta_c$ at the estimated position $(x_s, y_s)$. In steps S2a and S2b the following correlation vectors are completed with respect to line segments LC and RC divided from the straight line joining neighboring positions:

$$G = \begin{bmatrix} (\hat{g}, \hat{f}_L) \\ (\hat{g}, \hat{f}_C) \end{bmatrix} \quad (73)$$

$$G = \begin{bmatrix} (\hat{g}, \hat{f}_C) \\ (\hat{g}, \hat{f}_R) \end{bmatrix} \quad (74)$$

In steps S3a and S3b the inverse correlation matrix $H^{-1}$ is substituted into the following equations (75) and (76) to derive the estimated parameters w:

$$w = \frac{H^{-1}G}{(n, HG)} = [w_L, w_C]^T \quad (75)$$

$$w = \frac{H^{-1}G}{(n, HG)} = [w_C, w_R]^T \quad (76)$$

Next, in steps S4a and S4b these parameters $W_L$, $W_C$ and $W_R$ thus obtained are substituted into the following equations:

$$\langle f \rangle_w \equiv \sum_{k=L,C} w_k \hat{f}_k \bigg/ \bigg\| \sum_{k=L,C} w_k \hat{f}_k \bigg\| \quad (77)$$

$$\langle f \rangle_w \equiv \sum_{k=C,R} w_k \hat{f}_k \bigg/ \bigg\| \sum_{k=C,R} w_k \hat{f}_k \bigg\| \quad (78)$$

to obtain normalized interpolated images $\langle f \rangle_w$, from which normalized correlations $(\hat{g}, \langle f \rangle_w)$ are calculated in steps S5a and S5b. In step S6 estimated angles $\theta_s$ are calculated by Eqs. (62) and (63) with respect to the line segments LC and RC. Of the two estimated angles, the one that provides the higher normalized correlation is determined as the estimated angle $\theta_s$.

Finally, the parametric template method will be described with reference to FIG. 25. In step S1 the correlation matrix H and its inverse matrix $H^{-1}$ are calculated based on the vertex templates. In step S2 the correlation vector G is calculated from the vertex templates and the reference template. Next, in step S3 the parameter w is calculated by Eq. (32) from the inverse matrix $H^{-1}$ of the correlation matrix H and the correlation vector G.

<Effect of the Invention>

As described above, in the normalized correlation matching procedure which performs matching by shifting a template image in a search image to find the position where the maximum normalized correlation is provided, the present invention represents the search template space in a parametric form and hence as a two-dimensional continuous reference template pattern, not discrete as in the past. Thus, it is possible to quickly provide highly reliable search results and solve the problem of a search failure or decrease in the accuracy of estimated positions when difficulties are encountered in representing the search object as one search template image due to individual fluctuations of the object in the search image or fluctuations in the inspection environments.

In particular, in the case of employing the coarse-to-fine scheme, the present invention precludes the possibility of search failure in the coarse search often experienced in the prior art, by sorting coarse search results to obtain a plurality of candidates and performing a fine search of the candidates. Further, the problem of search failure in the fine search can be settled by high precision estimation through matching in the parametric template space. Since the matching in the parametric template space can be done at high speed, a fine search of many candidates resulting from the coarse search can be made in a short time. Thus, the present invention quickly provides highly reliable estimation results even if the search image is large. Additionally, a high precision from 1/10 to 1/20 pixel can be achieved in the position of search.

It will be apparent that many modifications and variations may be effected without departing from the scope of the novel concepts of the present invention.

What is claimed is:

1. A template matching method for matching an image with a plurality of template images to detect the maximum correlation value therebetween, comprising the steps of:

(a) calculating an inverse matrix $H^{-1}$ of a correlation matrix H using, as its elements, normalized correlations between a plurality of first template images;

(b) calculating a normalized correlation between a normalized image of each of a plurality of normalized first template images and at least one normalized second template image to obtain a correlation vector G; and (c) calculating, from said correlation vector G and said inverse matrix $H^{-1}$, an estimated parameter w that maximizes a normalized correlation between said normalized second template image and a normalized interpolated template image obtained by linearly combining, by said estimated parameter w, said normalized first template images.

2. The method of claim 1, wherein:

said plurality of normalized first template images are a plurality of predetermined normalized reference template images and said second template image is a normalized matching region image at a position (x,y) in a search image;

said step (a) is a step of calculating an inverse matrix $H^{-1}$ of a correlation matrix H that uses, as its elements, normalized correlations between a plurality of reference template images ($g_0, \ldots, g_M$);

said step (b) is a step of calculating normalized correlations between a plurality of normalized reference template images ($\hat{g}_0, \ldots, \hat{g}_M$) and a matching region image f(x,y) normalized at said position (x,y) in said search image to obtain said correlation vector G; and said step (c) includes a step of calculating a normalized interpolated template image $g_w$ from said estimated parameter w;

said method further comprising the steps of:
- (d) calculating and storing a normalized correlation between the normalized interpolated template image $g_w$ and the matching region image f(x,y) at the position (x,y);
- (e) repeating the steps (b) through (d) while sequentially shifting the position (x,y) in the search image; and
- (f) finding out the maximum one of the stored normalized correlations, thereby detecting a position where the normalized correlation value is at the maximum.

3. The method of claim 2, wherein said correlation matrix in said step (a) is calculated by the following equation:

$$H \equiv \begin{bmatrix} (\hat{g}_0, \hat{g}_0) & (\hat{g}_0, \hat{g}_1) & \cdots & (\hat{g}_0, \hat{g}_M) \\ (\hat{g}_1, \hat{g}_0) & (\hat{g}_1, \hat{g}_1) & \cdots & (\hat{g}_1, \hat{g}_M) \\ \vdots & \vdots & & \vdots \\ (\hat{g}_M, \hat{g}_0) & (\hat{g}_M, \hat{g}_1) & \cdots & (\hat{g}_M, \hat{g}_M) \end{bmatrix}.$$

4. The method of claim 2, wherein said estimated parameter w in said step (c) is calculated by a method of Lagrange multiplier.

5. The method of claim 2, where in said normalized interpolated template image $\langle g \rangle_w$ is calculated by $$\langle g \rangle_w \equiv \sum_{i=0}^{M} w_i \hat{g}_i \bigg/ \left\| \sum_{i=0}^{M} w_i \hat{g}_i \right\|.$$

6. The method of claim 1, wherein:

said plurality of normalized first template images include at least one normalized matching region image at a position (x,y) or its vicinity in said search image and said second template image is a preset normalized reference template image;

said step (a) is a step of calculating an inverse matrix $H^{-1}$ of a correlation matrix H that uses, as its elements, normalized correlations between said plurality of matching region images ($f_0, \ldots, f_M$);

said step (b) is a step of calculating normalized correlations between a plurality of matching region images ($\hat{f}_0, \ldots, \hat{f}_M$) normalized at said position (x,y) in said search image and a normalized reference template image $\hat{g}$ to obtain said correlation vector G; and said step (c) includes a step of calculating a normalized interpolated template image $\langle f \rangle_w$ from said estimated parameter w.

7. The method of claim 6 further comprising the steps of:

(p-1) setting, as said position (x,y), each of lattice points defined on said search image at sampling intervals $\Delta x$ and $\Delta y$ larger than the pixel spacing of said search image, calculating at said each lattice point normalized correlation values between said reference template image and matching region images in said search image at a plurality of angles θ spaced by a predetermined angular distance $\Delta\theta$ apart with respect to said reference template image, and determining the maximum one of said normalized correlation values as a normalized correlation value at said each lattice point;

(p-2) selecting at least one maximum normalized correlation value from said normalized correlation values at said each lattice point and setting its position and angle corresponding to said selected maximum normalized correlation value, as a candidate position-angle ($x_c, y_c, \theta_c$); and (d) performing said steps (a) through (c) for said candidate position-angle ($x_c, y_c, \theta_c$) at said each lattice point, and determining a position-angle that maximizes the normalized correlation between said normalized interpolated template image and said normalized reference template image, as an estimated position-angle ($x_s, y_s, \theta_s$) of a matching region most similar to said matching region image in said search image.

8. The method of claim 7, further comprising a step of performing said step (d) again after setting said estimated position-angle ($x_s, y_s, \theta_s$) in said step (d) as a new candidate position-angle ($x_c, y_c, \theta_c$) and reducing said sampling intervals $\Delta x$ and $\Delta y$ and said angular distance $\Delta\theta$ by dividing with reduction ratios $Z_x$, $Z_y$ and $Z_\theta$ larger than unity.

9. The method of claim 7 or 8, wherein said plurality of matching region images in said step (b) are region images defined at four positions displaced $\Delta x$ and $\Delta y$ from a reference matching position ($x_c, y_c$) in vertical and horizontal directions, respectively.

10. The method of claim 6, further comprising the steps of:

(p-1) setting, as said position (x,y), each of lattice points defined on said search image at sampling intervals $\Delta x$ and $\Delta y$ larger than the pixel spacing of said search image, calculating at said each lattice point normalized correlation values between said reference template and matching regions in said search image at a plurality of angles θ spaced by a predetermined angular distance $\Delta\theta$ apart with respect to said reference template, and determining the maximum one of said normalized correlation values as a normalized correlation value at said each lattice point;

(p-2) selecting at least one maximum normalized correlation value from said normalized correlation values at said each lattice point and calculating its position and angle corresponding to said selected maximum normalized correlation value, as a candidate position-angle ($x_c, y_c, \theta_c$);

(d) performing said steps (a) through (c) for each of said candidate position-angles ($x_c, y_c, \theta_c$), and determining each position-angle that maximizes the normalized correlation between said normalized interpolated template image and said normalized reference template image, as an estimated position-angle ($x_s, y_s, \theta_s$), respectively; and (e) calculating, based on said estimated position-angle obtained for each of said plurality of candidate positions-angles, the position-angle of said normalized interpolated template image that provides the maximum normalized correlation value for said reference template image.

11. The method of claim 10 further comprising a step of performing said step (d) a plurality of times after setting said estimated position-angle ($x_s, y_s, \theta_s$) in said step (d) as a new candidate position-angle ($x_c, y_c, \theta_c$) and reducing said sampling intervals $\Delta x$ and $\Delta y$ and said angular distance $\Delta\theta$ by dividing with reduction ratios $Z_x$, $Z_y$ and $Z_\theta$ larger than unity and a step of determining one of a plurality of estimated positions-angles obtained by the repetition of said step (d) that provides the maximum normalized correlation value, as the position-angle of the matching region image most similar to said reference template image.

12. The method of claim 10 or 11, wherein said plurality of matching region images in said step (b) are region images defined at the four positions displaced ±Δx and ±Δy from said reference matching position ($x_c,y_c$) in vertical and horizontal directions, respectively.

13. The method of claim 8 or 11, wherein said step (d) is performed repeatedly until said Δx and Δy become smaller than one-pixel spacing of said search image.

14. The method of claim 7 or 10, wherein said step (d) includes a step of splitting a quadrangle region, which has corners at said four positions, by two diagonal lines of said quadrangle region into four triangle regions each having a corner at said candidate position ($x_c,y_c$) in common to them, performing said steps (a), (b) and (c) using, as said first template images, three vertex template images having vertices of vectors defined by matching region images on said search image at the three corners of each triangle region to determine interpolation parameters w that maximizes said normalized correlations with said reference template images, calculating the vertex position of a normalized interpolated template image defined by that one of the four interpolation parameters obtained for said four triangle regions which provides the maximum normalized correlation value, and determining said vertex position as said estimated position ($x_s,y_s$).

15. The method of claim 7 or 10, wherein said step (d) includes a step of performing said steps (a), (b) and (c) using, as said first template images, two vertex template images having vertices of vectors defined by matching region images in said search image at angular positions apart from said angle $\theta_c$ by Δθ on both sides thereof to determine an interpolation parameter w that maximizes said normalized correlation with said reference template image, and determining as an estimated position a vertex angular position of a normalized interpolated template image defined by said interpolation parameter.

16. A recording medium on which there is recorded a template matching procedure for matching an image with a plurality of template images to detect the maximum correlation value therebetween, said procedure comprising the steps of:

(a) calculating an inverse matrix $H^{-1}$ of a correlation matrix H using, as its elements, normalized correlations between a plurality of first template images;

(b) calculating normalized correlations between normalized images of said plurality of first template images and at least one normalized second template image to obtain a correlation vector G; and (c) calculating from said correlation vector G and said inverse matrix $H^{-1}$ of said correlation matrix H an estimated parameter w that maximizes a normalized correlation between said normalized second template image and a normalized interpolated template image obtained by linearly combining, by said estimated parameter w, said normalized first template images.

* * * * *